United States Patent
Soga

(10) Patent No.: US 10,737,207 B2
(45) Date of Patent: Aug. 11, 2020

(54) METHOD AND APPARATUS FOR PRODUCING CERAMIC HONEYCOMB FILTER

(71) Applicant: HITACHI METALS, LTD., Tokyo (JP)

(72) Inventor: Wataru Soga, Fukuoka (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/331,405

(22) PCT Filed: Sep. 29, 2017

(86) PCT No.: PCT/JP2017/035585
§ 371 (c)(1),
(2) Date: Mar. 7, 2019

(87) PCT Pub. No.: WO2018/062521
PCT Pub. Date: Apr. 5, 2018

(65) Prior Publication Data
US 2019/0201825 A1 Jul. 4, 2019

(30) Foreign Application Priority Data
Sep. 30, 2016 (JP) .................................. 2016-193213

(51) Int. Cl.
| | | |
|---|---|---|
| B01D 46/00 | (2006.01) | |
| B01D 46/24 | (2006.01) | |
| C04B 38/00 | (2006.01) | |
| C04B 111/00 | (2006.01) | |
| B28B 11/00 | (2006.01) | |
| F01N 3/022 | (2006.01) | |
| B05D 7/22 | (2006.01) | |

(52) U.S. Cl.
CPC ..... B01D 46/0001 (2013.01); B01D 46/2418 (2013.01); B28B 11/007 (2013.01); C04B 38/0006 (2013.01); C04B 38/0012 (2013.01); F01N 3/0222 (2013.01); B01D 2255/903 (2013.01); B01D 2255/915 (2013.01); B01D 2255/9155 (2013.01); B01D 2279/30 (2013.01); B05D 7/227 (2013.01); B05D 2203/30 (2013.01); B05D 2254/04 (2013.01); C04B 2111/00793 (2013.01); F01N 2330/06 (2013.01); F01N 2330/34 (2013.01)

(58) Field of Classification Search
CPC ........ B01D 2255/903; B01D 2255/915; B01D 2255/9155; B01D 2279/30; B01D 46/00; B01D 46/0001; C04B 2111/00793; C04B 38/0006; C04B 38/0012; F01N 2330/00; F01N 2330/06; F01N 2330/34; F01N 3/022; F01N 3/0222; B05D 2203/30; B05D 2254/04; B05D 7/22; B05D 7/227
See application file for complete search history.

(56) References Cited

U.S. PATENT DOCUMENTS

| | | | | |
|---|---|---|---|---|
| 4,550,034 A | * | 10/1985 | Shimrock | B01J 35/04 427/243 |
| 4,557,773 A | | 12/1985 | Bonzo | |
| 4,609,563 A | * | 9/1986 | Shimrock | B01J 37/0215 427/8 |
| 4,851,015 A | * | 7/1989 | Wagner | F01N 3/0211 95/15 |
| 5,953,832 A | * | 9/1999 | Rosynsky | B01J 37/0215 34/403 |
| 6,478,874 B1 | * | 11/2002 | Rosynsky | B01J 37/0215 118/50 |
| 7,374,792 B2 | * | 5/2008 | Rosynsky | B01J 37/0215 427/231 |
| 7,476,417 B2 | * | 1/2009 | Dettling | B01J 23/63 427/238 |
| 7,521,087 B2 | * | 4/2009 | Rosynsky | B05D 3/042 427/231 |

(Continued)

FOREIGN PATENT DOCUMENTS

| | | |
|---|---|---|
| JP | 58-37480 A | 3/1983 |
| JP | 2004-025098 A | 1/2004 |

(Continued)

OTHER PUBLICATIONS

International Search Report for PCT/JP2017/035585 dated, Dec. 19, 2017.

*Primary Examiner* — William P Fletcher, III
(74) *Attorney, Agent, or Firm* — Sughrue Mion, PLLC

(57) ABSTRACT

A method for producing a ceramic honeycomb filter having a ceramic honeycomb structure having plugs in predetermined cells: comprising using an apparatus having a reservoir having an inlet for a plugging material slurry and an upper opening, a porous plate with pluralities of openings covering the upper opening of the reservoir, and a holding member fixed to an upper end of the reservoir; keeping a lower surface of the sealing film attached to a lower end surface of the ceramic honeycomb structure apart from an upper surface of the porous plate by a distance D of more than 0 mm and 2.0 mm or less; supplying a predetermined volume of the plugging material slurry into the reservoir to introduce it into the predetermined cells of the ceramic honeycomb structure; rotating the ceramic honeycomb structure after sealing of the ceramic honeycomb structure is released; and lifting the ceramic honeycomb structure after the rotation starts.

16 Claims, 18 Drawing Sheets

(56) References Cited

U.S. PATENT DOCUMENTS

| | | | | |
|---|---|---|---|---|
| 2001/0026838 A1* | 10/2001 | Dettling | ................ | B01J 23/63 |
| | | | | 427/230 |
| 2005/0221014 A1 | 10/2005 | Nate et al. | | |
| 2007/0116870 A1* | 5/2007 | Dettling | ................ | B01J 23/63 |
| | | | | 427/230 |
| 2008/0128082 A1* | 6/2008 | Masuda | ............ | B01D 46/2418 |
| | | | | 156/293 |
| 2009/0155475 A1* | 6/2009 | Goshima | ................ | B01J 35/04 |
| | | | | 427/421.1 |
| 2012/0248643 A1* | 10/2012 | Cecce | ................ | B29C 43/003 |
| | | | | 264/40.5 |
| 2013/0243952 A1* | 9/2013 | Mori | .................. | B05C 13/025 |
| | | | | 427/230 |

FOREIGN PATENT DOCUMENTS

| | | | |
|---|---|---|---|
| JP | 2008-055347 A | 3/2008 | |
| JP | 2008-055796 A | 3/2008 | |
| JP | 2009-006629 A | 1/2009 | |
| JP | 4913915 B2 * | 4/2012 | ........... B28B 11/006 |
| JP | 2012-136011 A | 7/2012 | |
| JP | 2013-126637 A | 6/2013 | |
| WO | 2006/062141 A1 | 6/2006 | |
| WO | 2009/088078 A1 | 7/2009 | |

* cited by examiner

METHOD AND APPARATUS FOR PRODUCING CERAMIC HONEYCOMB FILTER

CROSS REFERENCE TO RELATED APPLICATIONS

This application is a National Stage of International Application No. PCT/JP2017/035585 filed Sep. 29, 2017, claiming priority based on Japanese Patent Application No. 2016-193213, filed Sep. 30, 2016.

FIELD OF THE INVENTION

The present invention relates to a method and an apparatus for producing a ceramic honeycomb filter by continuously forming plugs with high efficiency by introducing a plugging material slurry into end portions of a ceramic honeycomb structure.

BACKGROUND OF THE INVENTION

To remove carbon-based particulate matter from an exhaust gas discharged from diesel engines, ceramic honeycomb filters having ceramic honeycomb structures with flow paths alternately sealed at both ends has been used. As shown in FIGS. 12(a) and (b), a ceramic honeycomb filter 1 comprises a ceramic honeycomb structure 10 composed of pluralities of cells 13 partitioned by porous cell walls 12, and a peripheral wall 11; and plugs 14a, 14b alternately sealing both end portions 15a, 15b of cells 13 in a checkerboard pattern. The exhaust gas containing particulate matter flows into cells 13a open on an inlet-side end surface 16a, passes through the cell walls 12, and then flows out of adjacent cells 13b open on an outlet-side end surface 16b, during which particulate matter in the exhaust gas is captured by fine pores (not shown) in the cell walls 12.

To form plugs 14a, 14b in both end portions 15a, 15b of cells 13 of the ceramic honeycomb structure 10, for example, the following method has been conventionally used. That is, sealing films 6 made of a resin, etc. are attached to both end surfaces 16a, 16b of the ceramic honeycomb structure 10 [FIG. 13(a)], and provided with penetrating pores 6a, 6b alternately at positions corresponding to open cells in a checkerboard pattern by laser beams [FIG. 13(b)], such that only one end portion of each cell 13 is sealed by the sealing films 6.

The end surface 16a of the ceramic honeycomb structure 10 is immersed in a plugging material slurry 40 containing ceramic powder and a dispersing medium in a vessel 90 [FIG. 13(c)], and pushed downward to a predetermined depth. The plugging material slurry 40 is introduced into the predetermined cells 13 through the penetrating pores 6a of the sealing film 6, to form plugs 14a of the predetermined length in the end portions 15a of the cells 13 at the end surface 16a [FIG. 13(d)].

The ceramic honeycomb structure 10 provided with the plugs 14a in one-side end portions 15a is taken out of the vessel 90 [FIG. 13(e)]. With the end surface 16b immersed upside down in the plugging material slurry 40, the ceramic honeycomb structure 10 is pushed downward to a predetermined depth, to form plugs 14b in a checkerboard pattern in the other-side end portions 15b of the cells 13 [FIG. 13(f)]. Finally, the ceramic honeycomb structure 10 provided with the plugs 14a, 14b in the end portions 15a, 15b is taken out of the vessel 90 [FIG. 13(g)].

The plugs 14a, 14b are dried and sintered, to obtain the ceramic honeycomb filter 1 having the plugs 14a, 14b in a checkerboard pattern in the end portions 15a, 15b of the cells 13.

In this conventional method, when the ceramic honeycomb structure 10 having a plugging material slurry 40 charged into its end portions is lifted from the vessel 90, the plugging material slurry 40 falls from the end portions, resulting in large unevenness in length of the resultant plugs. A plugging material slurry 40 may drop off from pluralities of cells 13, resulting in a certain area of cells 13 with no plugs. When the plugs in the ceramic honeycomb structure 10 are largely uneven in length, the cell walls filtering an exhaust gas also have largely uneven surface areas, providing a filter having unstable particulate-matter-capturing performance and pressure loss performance, and thus resulting in a defective ceramic honeycomb filter, which should be discarded.

To suppress such unevenness in length of the plugs, it is contemplated to slide a ceramic honeycomb structure 10 having a plugging material slurry 40 charged into its end portions horizontally when taken out of the vessel 90. However, this method not only requires an at least partially detachable vertical wall in the vessel 90, but also fails to conduct the formation of plugs continuously.

As a method for suppressing the unevenness in length of the plugs, JP 2008-55347 A discloses, as shown in FIG. 14, a plugging method comprising (a) using an apparatus comprising a vessel 100 composed of a vertically movable side wall 101 and a bottom 102; a device 110 for holding a ceramic honeycomb structure, which comprises a pressing member 104 attached to a vertically movable arm 103, and a gripping member 105, and a chuck member 120 for sealing a clearance between an opening of the vessel 100 and the gripping member 105 of the gripping device 110; (b) charging a plugging material slurry into the vessel 100; (c) setting the ceramic honeycomb structure 130 gripped by the gripping device 110 in the plugging material slurry in the vessel 100; (d) sealing the clearance of the vessel 100 with the chuck member 120; (e) lifting the bottom of the vessel 100 to introduce the plugging material slurry under pressure into cell end portions of the ceramic honeycomb structure, thereby forming plugs; (f) rotating the bottom 102 of the vessel 100 to separate the plugging material slurry filled in the cell end portions from a small amount of the plugging material slurry remaining on the bottom 102 of the vessel 100, thereby preventing the plugging material slurry in the cell end portions from being pulled back into the vessel 100; (g) moving the side wall 101 downward; and then (h) sliding the ceramic honeycomb structure 130 along the bottom 102 to take it out of the vessel 100.

In the method of JP 2008-55347 A, however, because the bottom 102 of the vessel 100 is rotated while the clearance of the vessel 100 is sealed with the chuck member 120, air does not intrude into the plugging material slurry, failing to easily separate the plugging material slurry even with a shear force. Although the rotation of the bottom 102 gives a shear force to the plugging material slurry, the shear force disappears while the side wall 101 is moved downward, failing to obtain the effect of rotating the ceramic honeycomb structure 130. It has been found that when the ceramic honeycomb structure 130 slides along the bottom 102, the plugging material slurry in the cell end portions is physically separated from that remaining on the bottom 102, making the rotation of the bottom 102 unnecessary.

Furthermore, because the method of JP 2008-55347 A is a batch-type process having many steps, it takes too much time. Particularly, because a batch of a plugging material slurry should be supplied to the vessel 100 after lifting the once-lowered side wall 101, and because a subsequent step should wait until a surface of the plugging material slurry in the vessel 100 becomes flat, large time loss is inevitable. In addition, if the next batch of a plugging material slurry were supplied with some plugging material slurry remaining on the side wall 101 and the bottom 102 of the vessel 100, the amount of the plugging material slurry in the vessel 100 would not be constant, resulting in large unevenness in length of plugs formed in the cells. The supplying of the next batch of a plugging material slurry after removing the plugging material slurry remaining on the side wall 101 and the bottom 102 of the vessel 100 would need additional time.

As a method for forming plugs having uniform length in open end portions of cells, JP 2009-6629 A discloses, as shown in FIG. 15, an apparatus for plugging a honeycomb structure, comprising a plugging material slurry reservoir 201, a plate 202 with pluralities of openings 203 disposed on the reservoir 201, an inlet 204 for supplying a plugging material slurry to the reservoir 201, a valve 205 disposed in the inlet 204, and a piston 206 for supplying the plugging material slurry under pressure through pluralities of openings 203 of the plate 202. Because the plugging apparatus has pluralities of openings 203, the plugging material slurry with high viscosity can pass through the openings 203 under pressure by the piston 206, thereby forming a plugging material slurry layer with uniform thickness on an upper surface of the plate 202. Therefore, a leveling process is not necessary after the plugging material slurry is supplied. By disposing a honeycomb structure 210, to which a sheet having openings corresponding to predetermined cells is attached, on the plugging material slurry layer on an upper surface of the plate 202, and then lifting the piston 206 toward the plate 202, the plugging material slurry is introduced under pressure into the predetermined cells to form plugs. Because the plate 202 has a flat surface, the honeycomb structure 210 can be easily horizontally moved on the plate 202 to be taken out of the plugging apparatus.

Because the honeycomb structure 210 horizontally moves on the plate 202, the apparatus of JP 2009-6629 A does not have such a problem that plugs are pulled back when the honeycomb structure 210 is taken out. However, when the plugging material slurry is introduced under pressure by the piston 206 into the honeycomb structure 210 disposed on the plate 202, the plugging material slurry leaks from a lower edge of an outer periphery of the honeycomb structure 210. JP 2009-6629 A does not describe any mechanism of preventing the leakage of a plugging material slurry. Because the honeycomb structure 210 provided with plugs is horizontally moved on the plate 202 to be taken out of the plugging apparatus, it is not easy to install a mechanism for preventing the leakage of the plugging material slurry on the plate 202. The leakage of a plugging material slurry leads to large unevenness in length of plugs in the resultant honeycomb structures 210, resulting in defective ceramic honeycomb filters, which should be discarded.

As shown in FIG. 16, JP 2004-25098 A discloses a method for producing a ceramic honeycomb filter, comprising the steps of (a) pressing a lower end surface of a ceramic honeycomb structure 301 having flow paths 303 partitioned by pluralities of cells 304 on a bottom surface of a vessel 309 containing a plugging material slurry 308, thereby introducing the plugging material slurry 308 under pressure into predetermined cells 304, to form plugs 302; (b) rotationally lifting the ceramic honeycomb structure 301 by a slight distance, to form an air layer 310 between the plugs 302 and the bottom surface of the vessel 309 to separate them; and then (c) taking the ceramic honeycomb structure 301 provided with the plugs 302 out of the vessel 309. In the method of JP 2004-25098 A, however, because the ceramic honeycomb structure 301 is rotationally lifted from a state where the lower end surface of the ceramic honeycomb structure 301 is in close contact with the bottom surface of the vessel 309, the plugging material slurry 308 left between the ceramic honeycomb structure 301 and the vessel 309 is decompressed, causing the plugs 302 in the cells 304 to be pulled back, resulting in unevenness in their lengths.

As shown in FIG. 17, JP 2008-55796 A discloses a method for plugging a ceramic honeycomb structure 486 by using an apparatus having an annular upper housing 463 communicating with an air inlet, an annular lower housing 464 connected to the upper housing 463, a movable housing 465 disposed in the annular upper housing 463 and the annular lower housing 464, which is inflatable by supplying an compressed air, an elastic body 467 contained in the upper housing 463, which is inflatable by supplying an compressed air, and a second elastic body 466 connected to a vessel; the method comprising gripping a ceramic honeycomb structure 486 with the movable housing 465 and the elastic body 467 inflated by an compressed air; and immersing the ceramic honeycomb structure 486 in slurry stored in the vessel. However, JP 2008-55796 A fails to teach or suggest a process of taking the ceramic honeycomb structure 486 provided with plugs out of the vessel. When the ceramic honeycomb structure 486 provided with plugs is lifted from the vessel without rotation, part of the plugged slurry is pulled back, resulting in unevenness in the length.

OBJECT OF THE INVENTION

Accordingly, an object of the present invention is to provide a method and an apparatus for continuously producing a ceramic honeycomb filter, which can effectively make smaller the unevenness in length of plugs formed by introducing a plugging material slurry under pressure into predetermined cells of a ceramic honeycomb structure, not only in one ceramic honeycomb structure but also among individual ceramic honeycomb structures.

SUMMARY OF THE INVENTION

As a result of intensive research on why plugs formed by introducing a plugging material slurry into predetermined cells of a ceramic honeycomb structure have uneven lengths, the inventor has found that (a) when the ceramic honeycomb structure is lifted from a plugging material slurry in a vessel, at least part of the plugs in cells is pulled back, resulting in the uneven length of plugs; and that (b) to prevent the plugs in the cells from being pulled back, the ceramic honeycomb structure should be rotated before lifted from the plugging material slurry in the vessel, to sufficiently fluidize the plugging material slurry between the ceramic honeycomb structure and a porous plate, and to make it easy for air to enter from the surroundings. The present invention has been completed based on such finding.

Thus, the method of the present invention for producing a ceramic honeycomb filter having a ceramic honeycomb structure having pluralities of longitudinal cells partitioned by porous cell walls, each of the longitudinal cells extending from one end to the other end, and plugs formed in predetermined cells;

uses an apparatus comprising (a) a plugging material slurry reservoir having an inlet through which a plugging material slurry is supplied and an upper opening through which the plugging material slurry exits, (b) a porous plate with pluralities of openings covering the upper opening of the reservoir, and (c) a holding member fixed to an upper end of the reservoir for holding the ceramic honeycomb structure to which a sealing film is attached, the holding member having an elastic member on the inner peripheral side, the elastic member being inflatable to come into close contact with an outer peripheral surface of the ceramic honeycomb structure during the formation of the plugs; the method comprising the steps of (1) sealing a clearance between the ceramic honeycomb structure and the holding member with the elastic member inflated, while a lower surface of the sealing film attached to a lower end surface of the ceramic honeycomb structure is apart from an upper surface of the porous plate by a distance D of more than 0 mm and 2.0 mm or less;

(2) supplying a predetermined volume of a plugging material slurry into the reservoir through the inlet to introduce it into the predetermined cells of the ceramic honeycomb structure;

(3) rotating the ceramic honeycomb structure after the sealing of the ceramic honeycomb structure is released; and (4) lifting the ceramic honeycomb structure after the rotation starts.

The apparatus of the present invention for producing the above ceramic honeycomb filter comprises (a) a plugging material slurry reservoir having an inlet for supplying the plugging material slurry and an upper opening for ejecting the plugging material slurry;

(b) a porous plate with pluralities of openings covering the upper opening of the reservoir;

(c) a holding member fixed to an upper end of the reservoir for holding the ceramic honeycomb structure to which a sealing film is attached, the holding member having an elastic member on the inner peripheral side, the elastic member being inflatable to come into close contact with an outer peripheral surface of the ceramic honeycomb structure during the formation of the plugs;

(d) a device for inflating the elastic member to seal a clearance between the ceramic honeycomb structure and the holding member, while a lower surface of the sealing film attached to a lower end surface of the ceramic honeycomb structure is apart from an upper surface of the porous plate by a distance D of more than 0 mm and 2.0 mm or less;

(e) a device for supplying a predetermined volume of the plugging material slurry into the reservoir through the inlet to introduce it into a predetermined cells of the ceramic honeycomb structure;

(f) a device for rotating the ceramic honeycomb structure after the sealing of the ceramic honeycomb structure is released; and (g) a device for lifting the ceramic honeycomb structure after the rotation starts.

The openings of the porous plate preferably have inner diameters of 0.5-1.5 mm.

The porous plate is preferably a metal net. The metal net preferably has a mesh size of 0.5-1.5 mm.

The ceramic honeycomb structure is preferably rotated in one direction by a predetermined angle, and then lifted while rotating in an opposite direction.

The holding member preferably has a fixing member having a through-hole communicating with the elastic member, so that air is introduced under pressure into a closed space between the fixing member and the elastic member via the through-hole, to inflate the elastic member to come into close contact with the outer peripheral surface of the ceramic honeycomb structure.

A second elastic member with which the elastic member inflated is brought into close contact is preferably disposed on a lower portion of the outer peripheral surface of the ceramic honeycomb structure.

The apparatus of the present invention for producing a ceramic honeycomb filter preferably further comprises a baffle plate for preventing a flow of the plugging material slurry supplied through the inlet from coming into direct contact with the porous plate between the inlet and the upper opening in the reservoir. The baffle plate preferably has pluralities of pores with an opening area ratio of 10-60%.

Effects of the Invention

According to the present invention, by inflating an elastic member to seal a clearance between a ceramic honeycomb structure and a holding member, while a lower surface of a sealing film attached to a lower end surface of a ceramic honeycomb structure is apart from an upper surface of a porous plate by a distance D of more than 0 mm and 2.0 mm or less, introducing a plugging material slurry into predetermined cells of the ceramic honeycomb structure, rotating the ceramic honeycomb structure, and lifting it after the rotation starts, the plugging material slurry between the lower end surface of the ceramic honeycomb structure and the porous plate is sufficiently fluidized, and air easily enters from the surroundings, due to the rotation of the ceramic honeycomb structure with a gap of the distance D. As a result, when the ceramic honeycomb structure starts to be lifted from the holding member, plugs in the cells would not be pulled back. Accordingly, the length unevenness of the plugs formed in the cells can be reduced not only in one ceramic honeycomb structure but also among the individual ceramic honeycomb structures.

The method and apparatus of the present invention can continuously form the plugs in the ceramic honeycomb structures with good efficiency by introducing a predetermined volume of a plugging material slurry into predetermined cells of the ceramic honeycomb structure.

BRIEF DESCRIPTION OF THE DRAWINGS

FIG. 1(*b*) is a schematic cross-sectional view showing a ceramic honeycomb structure, to both end surfaces of which sealing films are attached.

FIG. 1(*c*) is a schematic cross-sectional view showing a ceramic honeycomb structure in which sealing films are provided with penetrating pores.

FIG. 2(*b*) is an exploded cross-sectional view showing an example of plugging-material-slurry-introducing apparatuses, which is used in the present invention.

FIG. 2(*c*) is a plan view showing a holding member constituting the plugging-material-slurry-introducing apparatus of FIG. 2(*a*).

FIG. 2(*d*) is a plan view showing a porous plate constituting the plugging-material-slurry-introducing apparatus of FIG. 2(*a*).

DESCRIPTION OF THE PREFERRED EMBODIMENTS

The embodiments of the present invention will be specifically explained below without intention of restricting the present invention thereto. Proper modifications and improvements can be made based on the usual knowledge of those skilled in the art within the scope of the present invention. It should be noted that explanations of each embodiment will be applicable to any other embodiments unless otherwise mentioned.

[1] Production of Ceramic Honeycomb Structure

A ceramic honeycomb structure used for a ceramic honeycomb filter is formed by mixing and blending at least ceramic material powder, an organic binder and water, and if necessary a pore-forming material, a lubricant, etc., to prepare a moldable material; extrusion-molding it to a honeycomb shape having, for example, an outer diameter of 150 mm or more, a wall thickness of 0.2-0.5 mm and a cell density of 100-400 cells/inch by using an extrusion-molding die; drying the resultant ceramic honeycomb green body in a hot-air furnace, a microwave-drying apparatus, etc.; roughly cutting it to a predetermined length with a band saw; and then sintering it. Both ends of the sintered ceramic honeycomb structure is ground to a predetermined length with a diamond wheel. Materials preferable for the ceramic honeycomb structure include cordierite, alumina, silica, silicon nitride, silicon carbide, aluminum titanate, LAS, etc. Among them, a ceramic comprising cordierite as a main crystal phase is most preferable, because it is inexpensive and has excellent heat resistance and chemical stability.

[2] Attachment and Perforation of Sealing Film

Figure 1A:
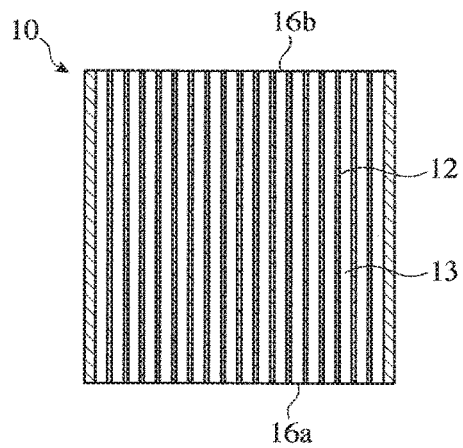
FIG. 1(*a*) is a schematic cross-sectional view showing a ceramic honeycomb structure.
Figure 1B:
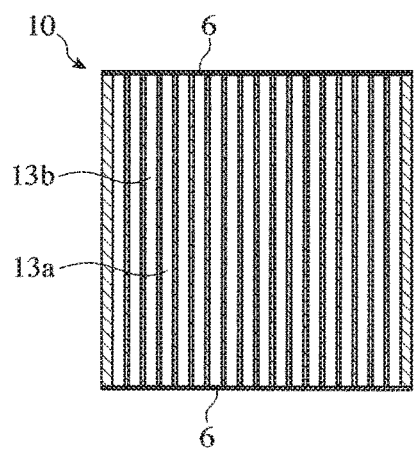
Figure 1C:
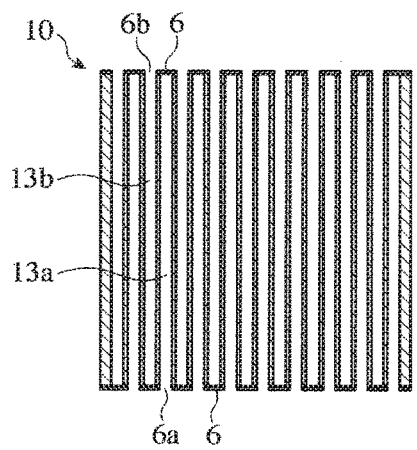

Sealing films 6, 6 are attached to both end surfaces 16a, 16b of the ceramic honeycomb structure 10 shown in FIG. 1(a) [FIG. 1(b)], and provided with penetrating pores 6a, 6b corresponding to the cells 13 in a checkerboard pattern, to have cells 13a open on the end surface 16a and cells 13b open on the end surface 16b [FIG. 1(c)]. The penetrating pores 6a, 6b are preferably formed by laser beams because of accuracy and high speed, but may be formed by any methods capable of perforating the sealing films 6, 6, for example, by perforating the films with a metal rod having a sharp tip or by pushing a hot metal rod against the films. With the penetrating pores 6a, 6b formed, the cells 13a communicated with penetrating pores 6a of the sealing film 6 at one end surface 16a are sealed with the sealing film 6 at the other end surface 16b, and the cells 13b communicated with penetrating pores 6b of the sealing film 6 at the other end surface 16b are sealed with the sealing film 6 at one end surface 16a.

The sealing film is preferably a rubber film based on an acrylic rubber, a styrene-butadiene rubber, etc., or a resin film made of polypropylene, etc. to which an acrylic adhesive is attached.

[3] Plugging Material Slurry

The plugging material slurry contains at least ceramic material powder and water, and may contain an organic binder, an inorganic binder, etc., if necessary.

(1) Ceramic Material Powder

The ceramic material powder is preferably made of the same material as that of the ceramic honeycomb structure, for integration after sintering. Therefore, it may be made of cordierite, alumina, silica, silicon nitride, silicon carbide, aluminum titanate, LAS, etc. When the ceramic honeycomb structure is made of cordierite, the ceramic material powder is preferably cordierite-producing material powder which forms cordierite after sintering, or sintered cordierite powder for reduced shrinkage during sintering plugs.

The particle size distribution of the ceramic material powder may have either one peak or two or more peaks. To make it easy to introduce a plugging material slurry into the cells of the ceramic honeycomb structure, the average particle size of the ceramic material powder is preferably 30-150 μm.

(2) Viscosity of Plugging Material Slurry

The viscosity of the plugging material slurry is preferably 10-25 Pa·s. When the viscosity of the plugging material slurry is as low as less than 10 Pa·s, just-formed plugs cannot fully remain in the cells while the ceramic honeycomb structure is lifted from the reservoir, failing to form the plugs of a desired length, resulting in large unevenness in length of the plugs. On the other hand, when the viscosity of the plugging material slurry is as high as more than 25 Pa·s, it is difficult to introduce the plugging material slurry into the cells, resulting in large unevenness in length of the plugs not only in one ceramic honeycomb structure but also among individual ceramic honeycomb structures. The viscosity of the plugging material slurry is preferably 12-22 Pa·s.

[4] Plugging-Material-Slurry-Introducing Apparatus

FIGS. 2(a)-2(d) show an example of apparatuses for introducing a plugging material slurry into end portions 15a, 15b of predetermined cells 13 open on both end surfaces 16a, 16b of the ceramic honeycomb structure 10. This apparatus comprises a plugging material slurry reservoir 20, a porous plate 24 covering an upper opening of the reservoir 20, and a holding member 30 fixed to an upper end of the reservoir 20. The plugging material slurry reservoir 20, the porous plate 24 and the holding member 30 may be fixed to each other by bolts, clamps, etc., and may be provided with sealing members such as rubber packing (not shown) between them.

(1) Plugging Material Slurry Reservoir

Figure 2A:
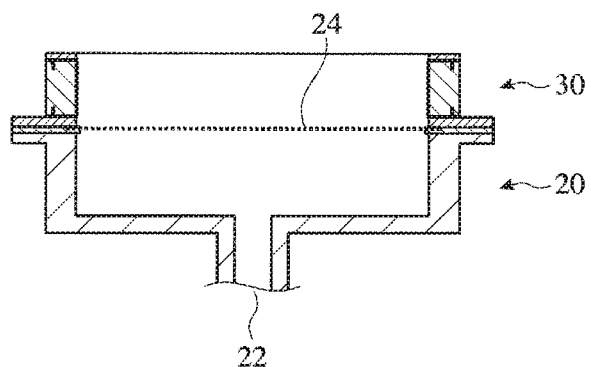
FIG. 2(*a*) is a cross-sectional view showing an example of plugging-material-slurry-introducing apparatuses, which is used in the present invention.
Figure 2B:
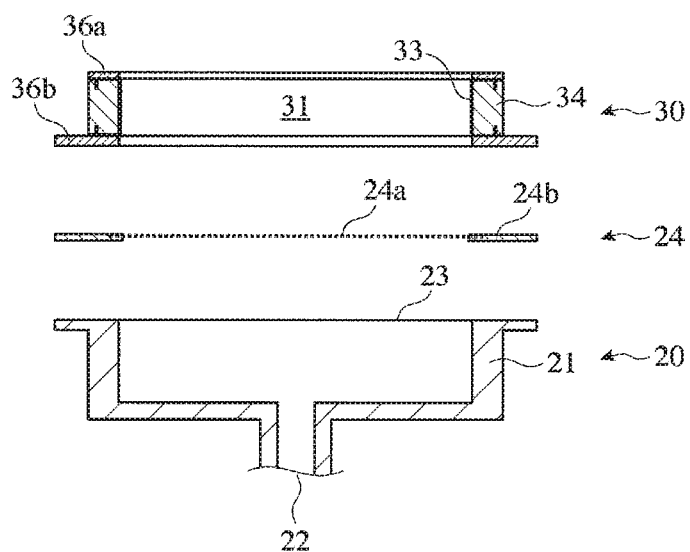
Figure 2C:
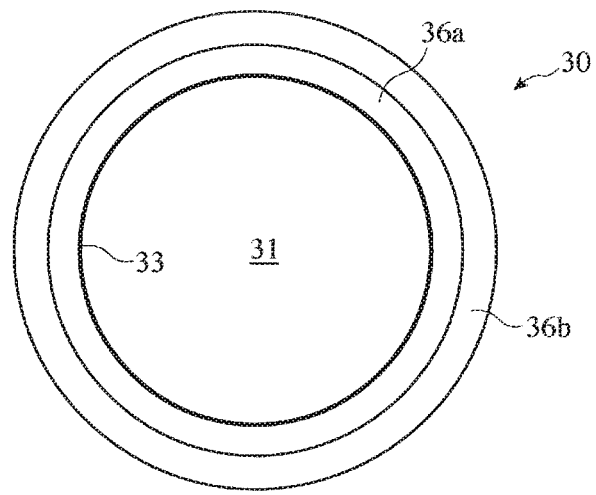

The plugging material slurry reservoir 20 shown in FIGS. 2(a) and 2(b) comprises a thin cylindrical reservoir body 21 having an upper opening 23, and an inlet 22 located in a central bottom portion of the reservoir body 21. The inlet 22 is connected to a pump (not shown), and supplied with a predetermined volume of a plugging material slurry 40. The reservoir body 21 needs to have a volume enough for a predetermined volume of the supplied slurry 40 to have sufficient surface smoothness. When the reservoir body 21 has an insufficient volume, there is a density (pressure) distribution in the plugging material slurry 40 supplied to the reservoir body 21, resulting in uneven lengths of the resultant plugs.

To supply the plugging material slurry 40 in a volume necessary for forming plugs of a desired length, a Mohno pump is preferably used as the pump. The Mohno pump supplies a liquid by rotating a spiral shaft in a pipe. Because a constant volume of a fluid is supplied by the rotation of the spiral shaft, the Mohno pump can always supply a predetermined volume of a plugging material slurry. Therefore, a plugging material slurry having a volume corresponding to the desired length of the plugs can surely be introduced into the cells.

(2) Porous Plate

Figure 2D:
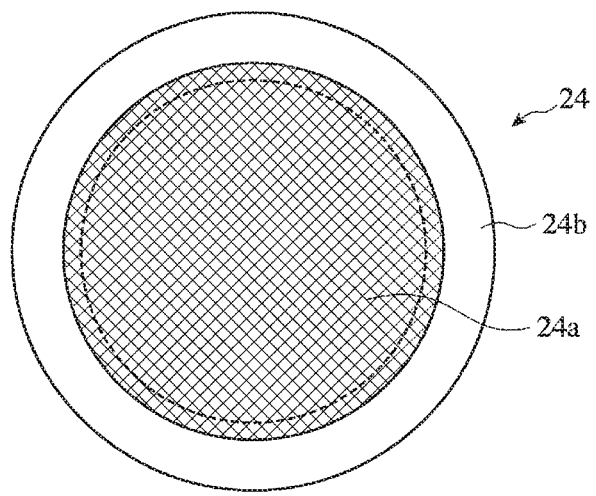

As shown in FIG. 2(d), the porous plate 24 covering the upper opening 23 of the plugging material slurry reservoir 20 comprises a porous portion 24a through which the plugging material slurry 40 passes, and a ring portion 24b fixing an outer periphery of the porous portion 24a. Because the plugging material slurry 40 passes through the porous plate 24, the porous plate 24 should have enough mechanical strength, wear resistance and corrosion resistance. Therefore, the porous plate 24 is preferably made of a metal, particularly, stainless steel.

When the porous portion 24a is a plate having pluralities of openings, it may be integrated with the ring portion 24b. The porous portion 24a of the porous plate 24 may be a metal net, because of easy separation of a plugging material slurry layer 40a formed between the porous portion 24a and a lower end surface of the ceramic honeycomb structure 10 (see FIG. 9), and a large opening ratio and inexpensiveness. When the porous portion 24a is a metal net, an outer periphery of the metal net is preferably welded to the ring portion 24b.

The inner diameters of openings of the porous plate 24 are preferably about 0.5-1.5 mm, more preferably about 0.7-1.3 mm. When the opening is in a square shape, the inner diameter is defined as its diagonal length. Therefore, when the porous portion 24a is a metal net, the inner diameters of openings of the porous portion 24a are 1.4 times the mesh size of the metal net. An opening ratio of the porous plate (ratio of a total opening area to a whole area of the porous portion 24a) is preferably 30% or more to make it easy to introduce the plugging material slurry 40 into the cells, and preferably 80% or less to make it easy to separate the plugging material slurry layer 40a. The opening ratio of the porous plate is more preferably 40-70%.

When the porous portion 24a is a metal net, the metal net 24a preferably has a mesh size of 0.5-1.5 mm (inner diameter: 1.4 times). When the metal net 24a has a mesh size of less than 0.5 mm (inner diameter: less than 0.7 mm), it may be clogged with ceramic material powder in the plugging material slurry 40. On the other hand, when the metal net 24a has a mesh size of more than 1.5 mm (inner diameter: more than 2.1 mm), the plugging material slurry layer 40a between a lower surface 6e of the sealing film 6 attached to the lower end surface of the ceramic honeycomb structure 10 and an upper surface of the porous plate 24 is hardly separated by the rotation of the ceramic honeycomb structure 10. The metal net 24a more preferably has a mesh size of 0.7-1.3 mm. In addition, metal wires constituting the metal net 24a preferably have a diameter of 0.1-0.8 mm. When the wire diameter is less than 0.1 mm, the metal net 24a is easily deformed to have undulation by a small force, failing to secure the distance D between itself and the lower surface 6e of the film 6. On the other hand, the wire diameter of more than 0.8 mm is economically meaningless, because the metal net 24a can withstand sufficient tension without having such a large wire diameter. The metal wire constituting the metal net 24a more preferably has a diameter of 0.2-0.7 mm. Incidentally, two or more metal net 24a may be laminated, and their openings may have the same or different sizes.

(3) Holding Member

As shown in FIGS. 2(*a*)-2(*c*), the holding member 30 comprises an annular fixing member 34 made of a metal (for example, stainless steel), and an annular, inflatable elastic member 33 disposed on its inner peripheral side. A cavity 31 is defined inside the annular elastic member 33.

Figure 3A:
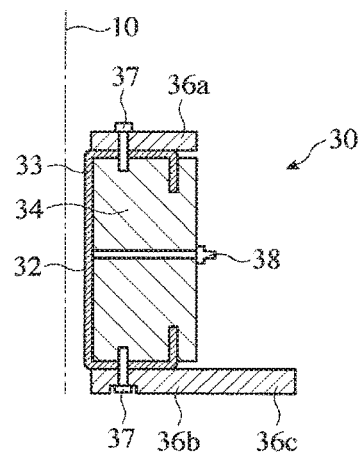
FIG. 3(*a*) is a partial cross-sectional view showing the details of a holding member.
FIG. 3(b) is a partially exploded cross-sectional view showing the details of a holding member.
FIG. 3(c) is a partial cross-sectional view showing the details of a holding member with an elastic member inflated.
Figure 3B:
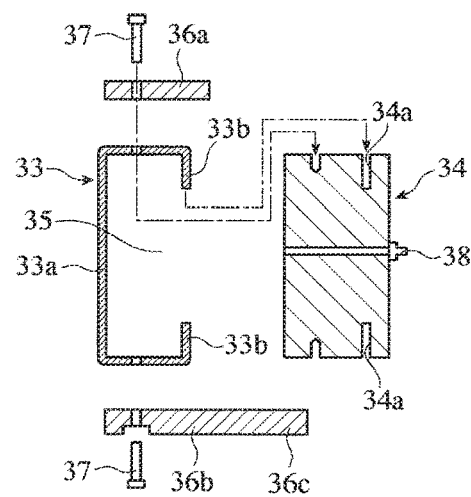
Figure 3C:
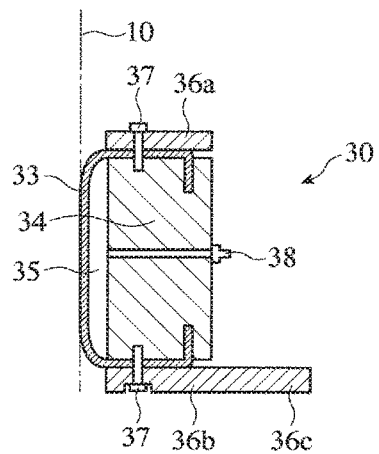

As shown in FIGS. 3(*a*) and 3(*b*) in detail, the elastic member 33 comprises an inflatable portion 33a and both end portions 33b, 33b. Both end portions 33b, 33b partially inserted into grooves 34a, 34a of the fixing member 34 are fixed to the fixing member 34 by screws 37, 37 via annular pressing plates 36a, 36b made of stainless steel. A closed space 35 is formed between the inflatable portion 33a and an inner peripheral surface of the fixing member 34.

By injecting air into the closed space 35 between the elastic member 33 and the fixing member 34 through a hole 38, the inflatable portion 33a of the elastic member 33 is inflated. While the cavity 31 defined by the inner peripheral surface of the not-inflated inflatable portion 33a of the elastic member 33 has a larger diameter than the outer diameter of the ceramic honeycomb structure 10 [FIG. 3(*a*)], the inner peripheral surface of the inflated inflatable portion 33a of the elastic member 33 comes into close contact with an outer peripheral surface of the ceramic honeycomb structure 10 [FIG. 3(*c*)]. The difference between the diameter of the cavity 31 and the outer diameter of the ceramic honeycomb structure 10 is preferably about 5-20 mm.

Materials for the elastic member 33 are not particularly limited as long as they are inflatable, but their preferred practical examples are natural rubber, butadiene rubber, butyl rubber, nitrile rubber, ethylene propylene rubber, chloroprene rubber, acrylic rubber, urethane rubber, silicone rubber, fluorine rubber, etc. Among them, silicone rubber is most preferable.

Figure 4:
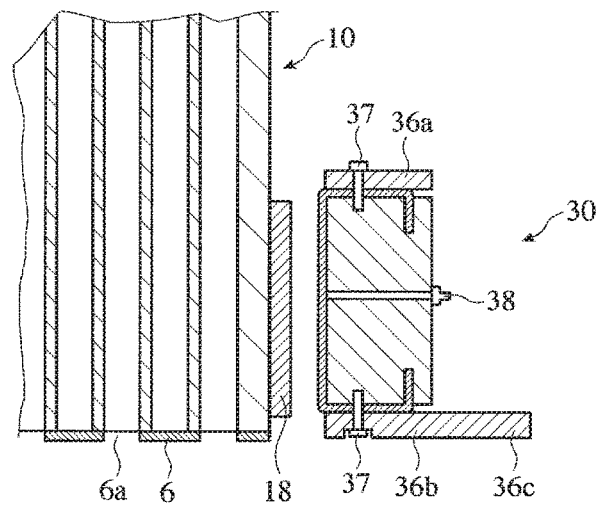
FIG. 4 is a partial cross-sectional view showing the details of a holding member, which opposes a second elastic member attached to a ceramic honeycomb structure.

Though direct contact is permissible, the elastic member 33 is preferably brought into contact with the ceramic honeycomb structure 10 via a second elastic member 18 attached to an outer peripheral surface of the ceramic honeycomb structure 10, as shown in FIG. 4. The second elastic member 18 attached to the outer peripheral surface of the ceramic honeycomb structure 10 is preferably softer than the elastic member 33. As long as the second elastic member 18 is softer than the elastic member 33, materials for the second elastic member 18 may be the same as or different from those of the elastic member 33, but are preferably flexible, elastic materials such as foamed urethane rubber. The second elastic member 18 is preferably an annular, flexible rubber belt for easy attachment. When the inflated elastic member 33 is brought into contact with the outer peripheral surface of the ceramic honeycomb structure 10 via the second elastic member 18, (a) a peripheral wall of the ceramic honeycomb structure 10 is not damaged, and (b) the elastic member 33 is brought into well close contact with the second elastic member 18, resulting in complete sealing between the holding member 30 and the ceramic honeycomb structure 10.

(4) Another Example of Plugging-Material-Slurry-Introducing Apparatuses

Figure 5:
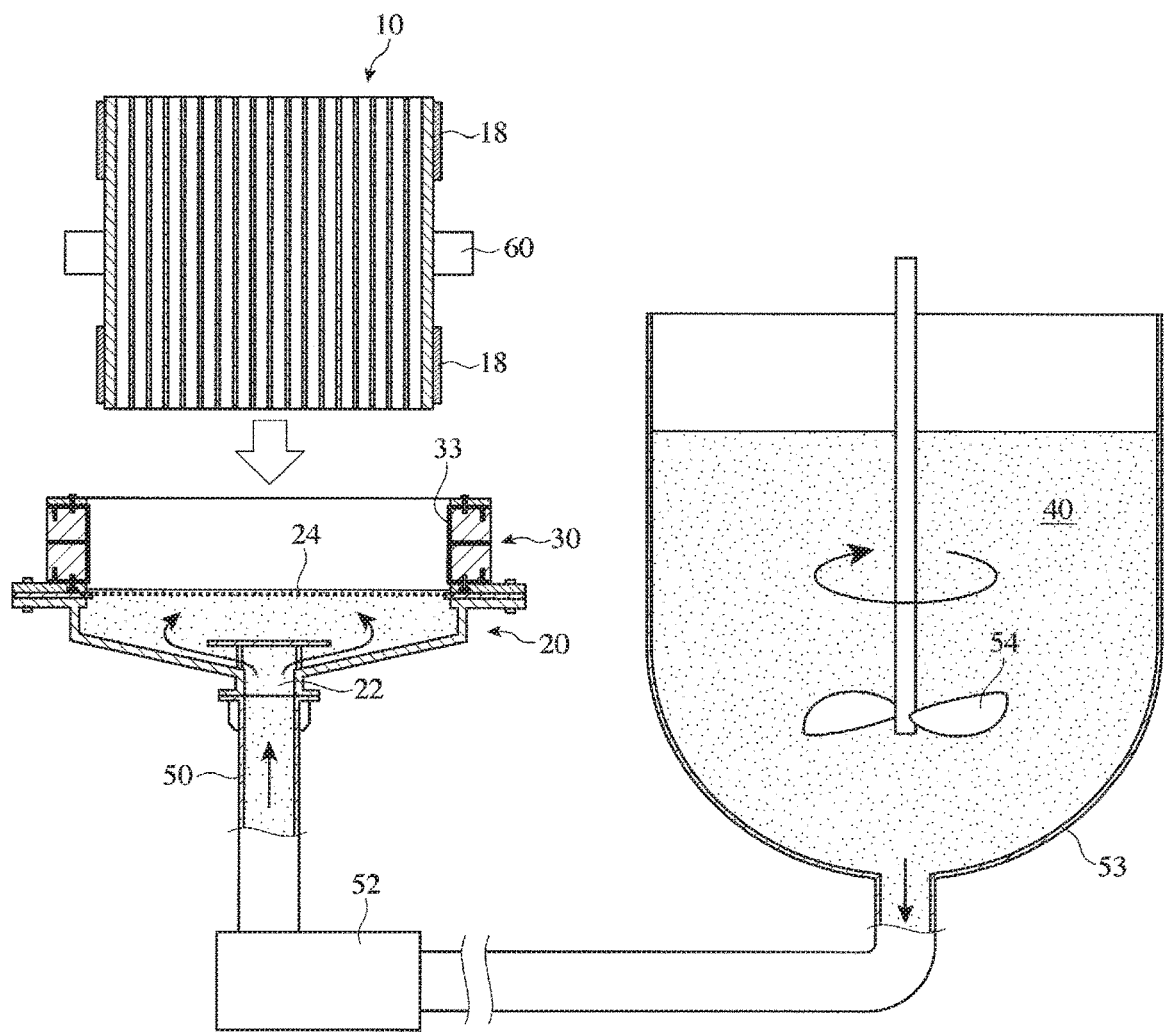
FIG. 5 is a cross-sectional view showing another example of plugging-material-slurry-introducing apparatuses, which is used in the present invention.

FIG. 5 shows another example of plugging-material-slurry-introducing apparatuses, which is used in the present invention. The same reference numerals are assigned to the same members as in the above example. This apparatus comprises a plugging material slurry reservoir 20, a porous plate 24 covering an upper opening of the reservoir 20, a holding member 30 fixed to an upper end of the reservoir 20, a pipe 50 connected to an inlet 22 of the plugging material slurry reservoir 20, a pump 52 disposed in a portion of the pipe 50, a plugging material slurry tank 53 connected to an upstream end of the pipe 50, and a blade 54 for stirring the plugging material slurry 40 in the tank 53.

Figure 6:
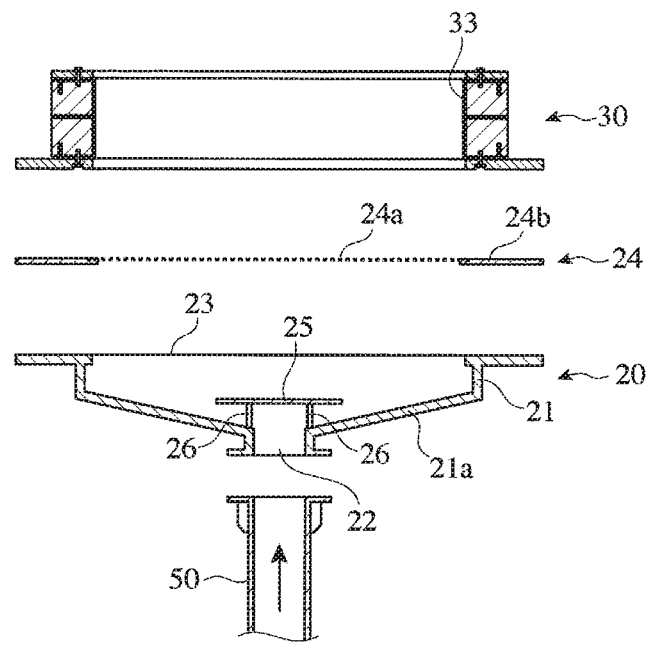
FIG. 6 is an exploded cross-sectional view showing another example of plugging-material-slurry-introducing apparatuses, which is used in the present invention.

As shown in FIG. 6, the plugging material slurry reservoir 20 comprises a thin cylindrical reservoir body 21 having a funnel-shaped bottom portion 21a, an inlet 22 located in a center portion of the funnel-shaped bottom portion 21a, an upper opening 23 of the reservoir body 21, and a baffle plate 25 supported by pluralities of legs 26 between the inlet 22 and the upper opening 23. The reservoir body 21 should have a volume enough for a predetermined volume of a plugging material slurry 40 supplied to have sufficient surface smoothness.

The baffle plate 25 may be a nonporous plate, but preferably has pluralities of pores to make a flow of the plugging material slurry 40 more uniform. The opening ratio of the pores is preferably 10-60%. The baffle plate 25 between the inlet 22 and the upper opening 23 can disperse a flow of the plugging material slurry 40 supplied to the reservoir body 21 through the inlet 22, thereby making the plugging material slurry 40 more uniform in the reservoir body 21.

As in the above example, the pump 52 is preferably a Mohno pump supplying a constant volume of a plugging material slurry 40 by rotating a spiral shaft in a pipe.

Figure 7:
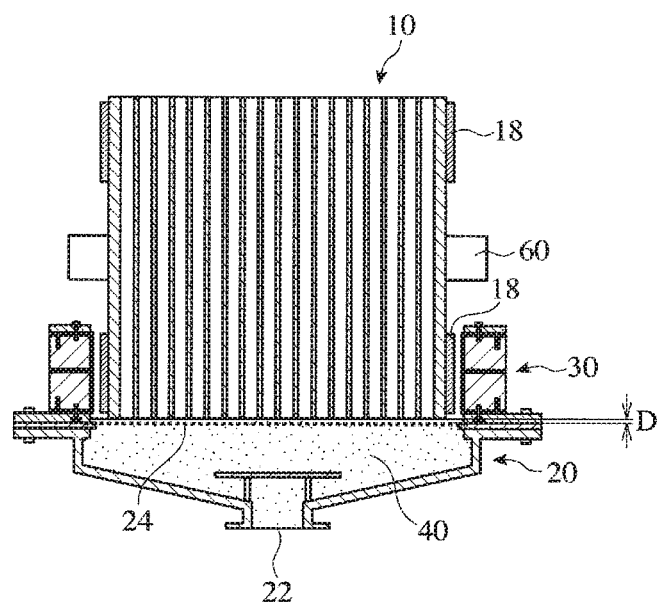
FIG. 7 is a cross-sectional view showing the plugging-material-slurry-introducing apparatus of FIG. 5, in which a ceramic honeycomb structure is disposed.

As shown in FIG. 7, when the ceramic honeycomb structure 10 gripped by a handling device 60 is set in this plugging-material-slurry-introducing apparatus, such that the lower surface 6e of the sealing film 6 attached to a lower end surface of the ceramic honeycomb structure 10 is apart from an upper surface of the porous plate 24 by a distance D, there is a slight clearance [(5-20 mm)/2] between the inner surface of the elastic member 33 of the holding member 30 and the outer peripheral surface of the ceramic honeycomb structure 10 (the outer peripheral surface of the second elastic member 18 in the depicted example). This clearance is sealed by the inflated elastic member 33.

[5] Formation of Plugs

Using the plugging-material-slurry-introducing apparatus shown in FIGS. 2 and 3 with a metal net as the porous plate 24, a method for forming plugs in the ceramic honeycomb structure 10 will be explained in detail referring to FIG. 8. In the example shown in FIG. 8, second elastic members 18, 18 are attached to both upper and lower end portions of the outer periphery of the ceramic honeycomb structure 10. The difference between the diameter of the cavity 31 and the outer diameter of the second elastic member 18 attached to the ceramic honeycomb structure 10 is preferably about 5-20 mm.

(1) Setting of Ceramic Honeycomb Structure

The ceramic honeycomb structure 10 having sealing films 6, 6 open on upper and lower end surfaces 16a, 16b and second elastic members 18, 18 attached to both upper and lower end portions is gripped by a handling device (for example, a robot hand) 60 [FIG. 8(*a*)], and then a lower end of the ceramic honeycomb structure 10 is set in the holding member 30, such that a lower surface 6*e* of the sealing film 6 attached to the lower end surface 16*a* of the ceramic honeycomb structure 10 is apart from the upper surface of the porous plate 24 by a distance D [FIG. 8(*b*)].

Before the ceramic honeycomb structure 10 is set, the plugging material slurry 40 is charged into the plugging material slurry reservoir 20 so as to slightly cover the upper surface of the porous plate 24. This surface height of the plugging material slurry 40 is adjusted to be the same as that of a plugging material slurry left on the metal net 24 when the ceramic honeycomb structure 10 provided with plugs is lifted. In a case where this adjustment is difficult, an adjusting ceramic honeycomb structure to which a sealing film 6 is attached is first set while the lower surface 6*e* of the sealing film 6 is apart from the upper surface of the metal net 24 by the distance D, a predetermined volume of the plugging material slurry 40 is supplied to the plugging material slurry reservoir 20 through the inlet 22 to introduce the plugging material slurry 40 into the predetermined cells 13*a* of the adjusting ceramic honeycomb structure, and the adjusting ceramic honeycomb structure is then rotationally lifted to determine the surface height of the plugging material slurry left on the metal net 24, which corresponds to the distance D.

By injecting air into the closed space 35 between the elastic member 33 and the inner peripheral surface of the fixing member 34 through injection holes 38, the elastic member 33 is inflated to come into close contact with the second elastic member 18 attached to the outer peripheral surface of the ceramic honeycomb structure 10 [FIG. 8(*c*)]. With the elastic member 33 inflated, the ceramic honeycomb structure 10 is held by the holding member 30 at such a position the lower surface 6*e* of the sealing film 6 attached to the lower end surface 16*a* of the adjusting ceramic honeycomb structure 10 is apart from the upper surface of the metal net 24 by the distance D of more than 0 mm and 2.0 mm or less.

The distance D is set such that the plugging material slurry layer 40*a* between the lower surface 6*e* of the sealing film 6 attached to the lower end surface of the adjusting ceramic honeycomb structure 10 and the upper surface of the metal net 24 (defined by a flat surface in contact with the upper surface of the metal net) is sufficiently fluidized by the rotation of the ceramic honeycomb structure 10. Specifically, the distance D is more than 0 mm and 2.0 mm or less. When the distance D is 0 mm (in close contact with the metal net 24), the plugging material slurry layer 40*a* hardly exists, resulting in insufficient fluidization even when the ceramic honeycomb structure 10 is rotated. To suitably fluidize the plugging material slurry layer 40*a*, the distance D is preferably 0.1 mm or more. On the other hand, when the distance D is more than 2.0 mm, the plugging material slurry layer 40*a* is too thick, resulting in insufficient fluidization even when the ceramic honeycomb structure 10 is rotated. The distance D is preferably 1.0 mm or less, more preferably 0.7 mm or less.

The distance D can be measured before setting the holding member 30 to the plugging material slurry reservoir 20, for example, by determining a coordinate position of the handling device (robot hand) 60 providing the distance D in advance; placing the ceramic honeycomb structure 10 to which the sealing film 6 is attached on the metal net 24 at the above coordinate position by the handling device 60; and inserting a feeler gauge into the gap between the ceramic honeycomb structure 10 and the metal net 24 at four points circumferentially separate by 90°, to measure the distance between the lower surface 6*a* of the sealing film 6 attached to the lower end surface of the ceramic honeycomb structure 10 and the upper surface of the metal net 24.

(2) Introduction of Plugging Material Slurry

A predetermined volume of the plugging material slurry 40 supplied to the plugging material slurry reservoir 20 through the inlet 22 by a pump (not shown) is introduced into the predetermined cells 13*a* of the ceramic honeycomb structure 10 through the metal net 24 [FIG. 8(*d*)], forming plugs 14*a* of a desired length in the lower end portions 15*a* of the predetermined cells 13*a*.

After the plugging material slurry 40 is introduced into the predetermined cells 13*a* of the ceramic honeycomb structure 10, the air is removed from the elastic member 33 to release close contact with the ceramic honeycomb structure 10 [FIG. 8(*e*)]. Though the rotation of the ceramic honeycomb structure 10 may start immediately thereafter, it starts preferably after a predetermined time lapse. This lapse time is preferably 1 second or more, and it is preferably 30 seconds or less for production efficiency. This lapse time is more preferably 2-10 seconds, most preferably 3-5 seconds.

(3) Rotation of Ceramic Honeycomb Structure

Immediately or a predetermined period of time after close contact with the ceramic honeycomb structure 10 is released, the ceramic honeycomb structure 10 is freed from gripping and rotated [FIG. 8(*e*)]. By the rotation of ceramic honeycomb structure 10, the plugging material slurry layer 40*a* between the lower end surface 16*a* of the ceramic honeycomb structure 10 and the metal net 24 is fluidized, and thus easily separated from the plugs 14*a* formed in the cells of the ceramic honeycomb structure 10 and the plugging material slurry 40 under the metal net 24.

A rotation angle before the start of lifting is preferably 30° or more, more preferably 60° or more. Because the ceramic honeycomb structure 10 needs to be rotated only by an angle enough to fluidize the plugging material slurry layer 40*a* between the lower end surface 16*a* of the ceramic honeycomb structure 10 and the metal net 24, the rotation angle may be 180° or less. The rotation speed is preferably 10-50°/second, more preferably 15-40°/second. When the rotation angle is less than 30° or the rotation speed is less than 10°/second, the plugging material slurry layer 40*a* is not sufficiently fluidized. More than 50°/second of the rotation speed rather deteriorates the separation of the plugging material slurry layer 40*a*.

(4) Lifting of Ceramic Honeycomb Structure

After rotation is started, the ceramic honeycomb structure 10 provided with the plugs 14*a* is rotationally lifted [FIG. 8(*f*)]. A lifting speed of the ceramic honeycomb structure 10 is preferably 20-80 mm/second. When the lifting speed is less than 20 mm/second, the separation effect of the plugging material slurry disappears. On the other hand, when the lifting speed is as high as more than 80 mm/second, the plugs may fall from some cells of the ceramic honeycomb structure 10, resulting in large unevenness in length of the plugs in the cells not only in one ceramic honeycomb structure 10 but also among individual ceramic honeycomb structures 10. The lifting speed of the ceramic honeycomb structure 10 is more preferably 30-70 mm/second.

The rotation conditions may be the same or different between the rotation step and the lifting step. In the latter case, the rotation direction is preferably reversed. The number of reversing the rotation direction is not limited to one, but may be two or more. With the rotation direction reversed, the plugging material slurry layer 40*a* is more easily separated from the plugs 14 in the cells 13 and the plugging material slurry 40 under the metal net 24.

The rotation of the ceramic honeycomb structure 10 need not be performed until the lifting step is finished, but may be terminated in the course of the lifting step as long as the plugs 14 in the cells become separable from the plugging material slurry layer 40a on the metal net 24. However, to certainly accomplish the separation, the rotation is preferably performed until the lifting step is finished.

Figure 8A:
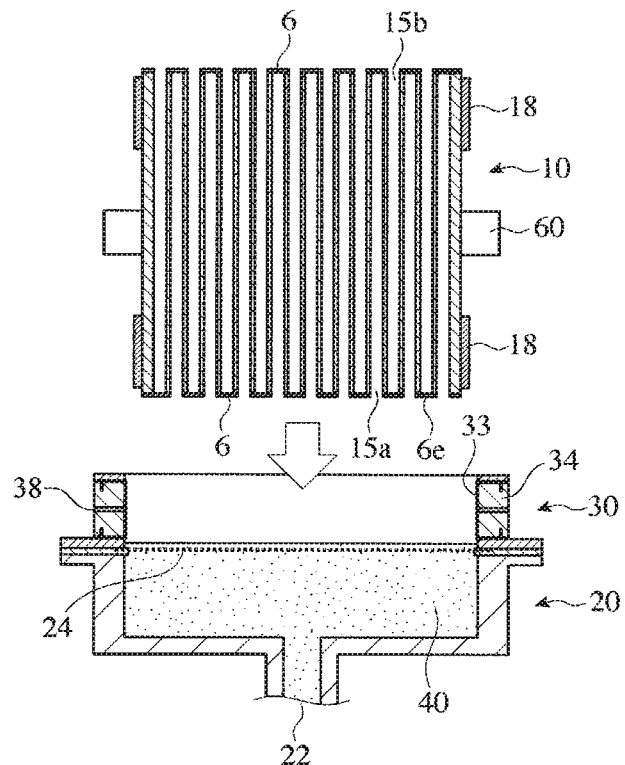
FIG. 8(a) is a cross-sectional view showing a ceramic honeycomb structure moving downward to a plugging-material-slurry-introducing apparatus having a reservoir, into which a plugging material slurry is charged.
Figure 8B:
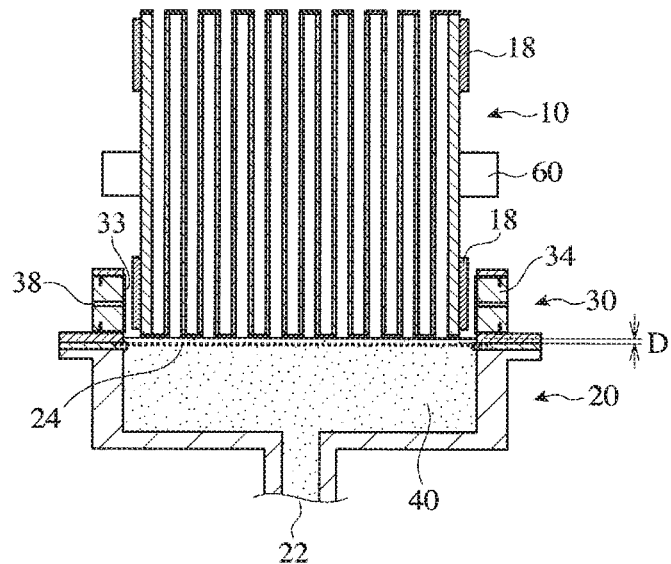
FIG. 8(b) is a cross-sectional view showing a ceramic honeycomb structure disposed in a plugging-material-slurry-introducing apparatus having a reservoir, into which a plugging material slurry is charged.
Figure 8C:
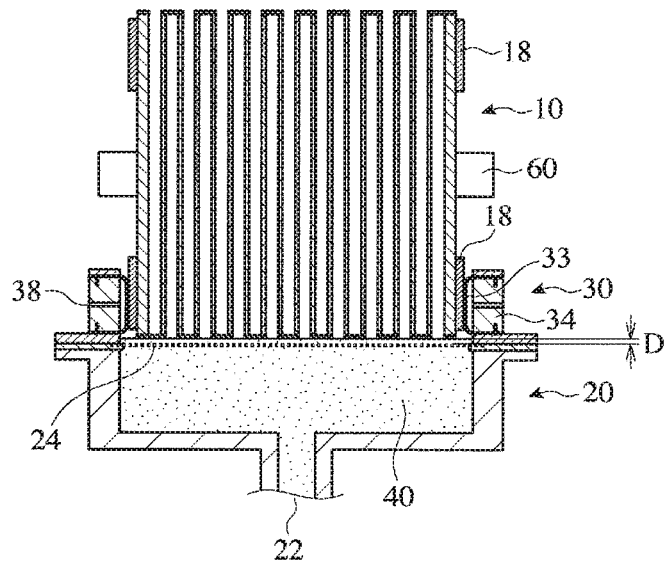
FIG. 8(c) is a cross-sectional view showing an inflated elastic member of a holding member, which comes into close contact with a second elastic member attached to a ceramic honeycomb structure.
Figure 8D:
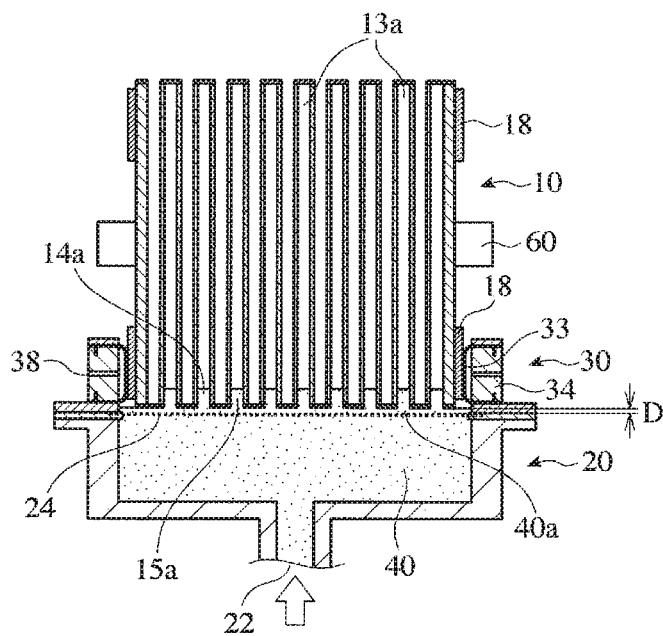
FIG. 8(d) is a cross-sectional view showing a plugging material slurry introduced into a ceramic honeycomb structure in a sealed state.
Figure 8E:
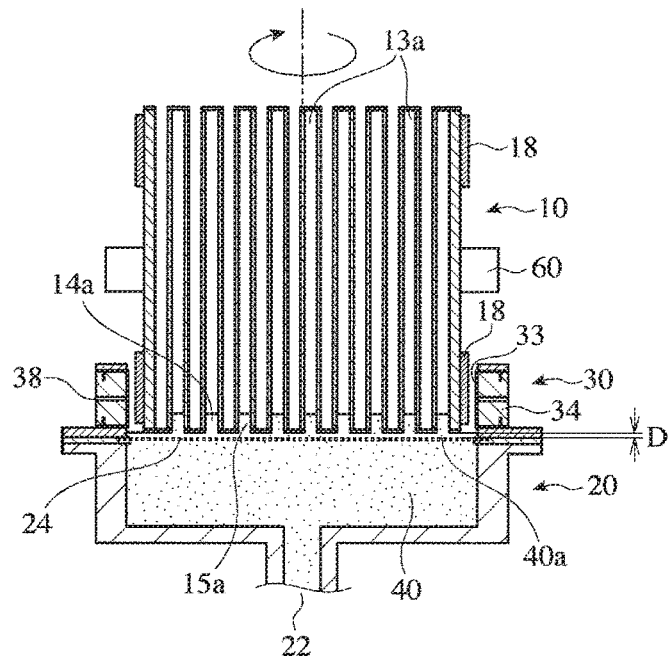
FIG. 8(e) is a cross-sectional view showing a ceramic honeycomb structure provided with plugs, which is rotated after sealing is released.
Figure 8F:
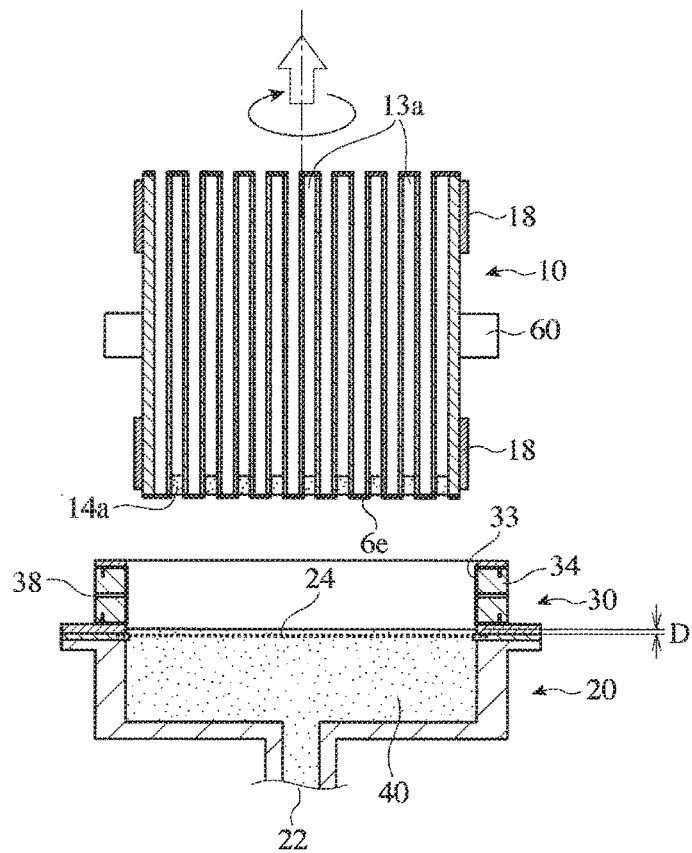
FIG. 8(f) is a cross-sectional view showing a ceramic honeycomb structure provided with plugs, which is lifted while being rotated.
Figure 8G:
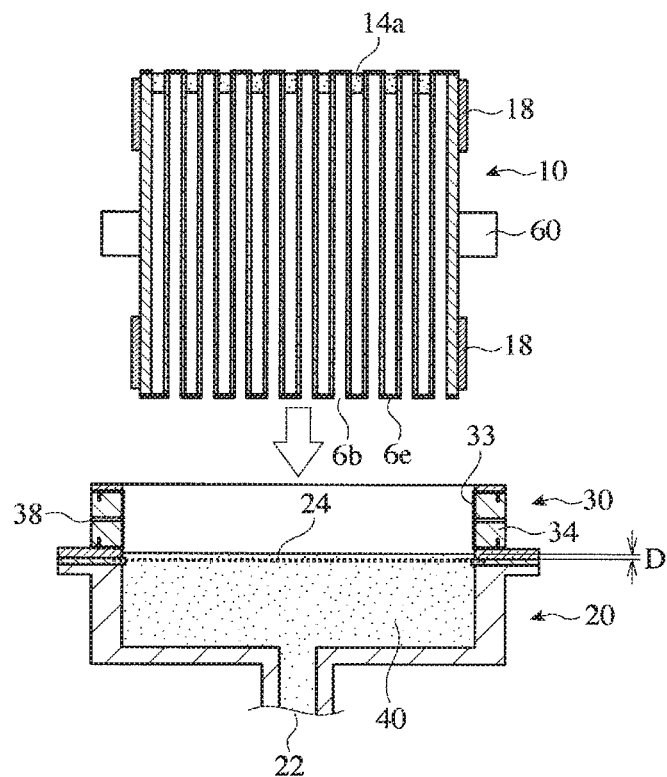
FIG. 8(g) is a cross-sectional view showing a ceramic honeycomb structure provided with plugs in one-side end portions, which is set upside down in a plugging-material-slurry-introducing apparatus.

After the plugs 14a are formed in one-side end portions 15a, the ceramic honeycomb structure 10 is turned upside down [FIG. 8(g)], and then the steps shown in FIGS. 8(a)-8(f) are repeated. The ceramic honeycomb structure 10 provided with the plugs 14a, 14b in both end portions is taken out of the holding member 30, and then a new ceramic honeycomb structure 10 is set in the holding member 30. By repeating the steps shown in FIGS. 8(a)-8(g) in this way, plugs can be continuously formed in the ceramic honeycomb structures 10 with good efficiency.

Though the holding, rotation and lifting of the ceramic honeycomb structures 10 may be conducted by different handling devices 60, they can be conducted by only one robot hand for simplification of the apparatus and easy change of settings.

(5) Principle of Separation of Plugging Material Slurry Layer

The plugging material slurry 40 introduced into the cells turns to plugs 14 with its water absorbed by the ceramic honeycomb structure 10. However, the just-formed plugs 14 are still at least partially fluid and connected to the plugging material slurry layer 40a on the metal net 24. When the ceramic honeycomb structure 10 is lifted in this state, the plugs 14 in the cells are pulled back by the plugging material slurry layer 40a, resulting in not only length unevenness but also dropping off from part of the cells.

Figure 9:
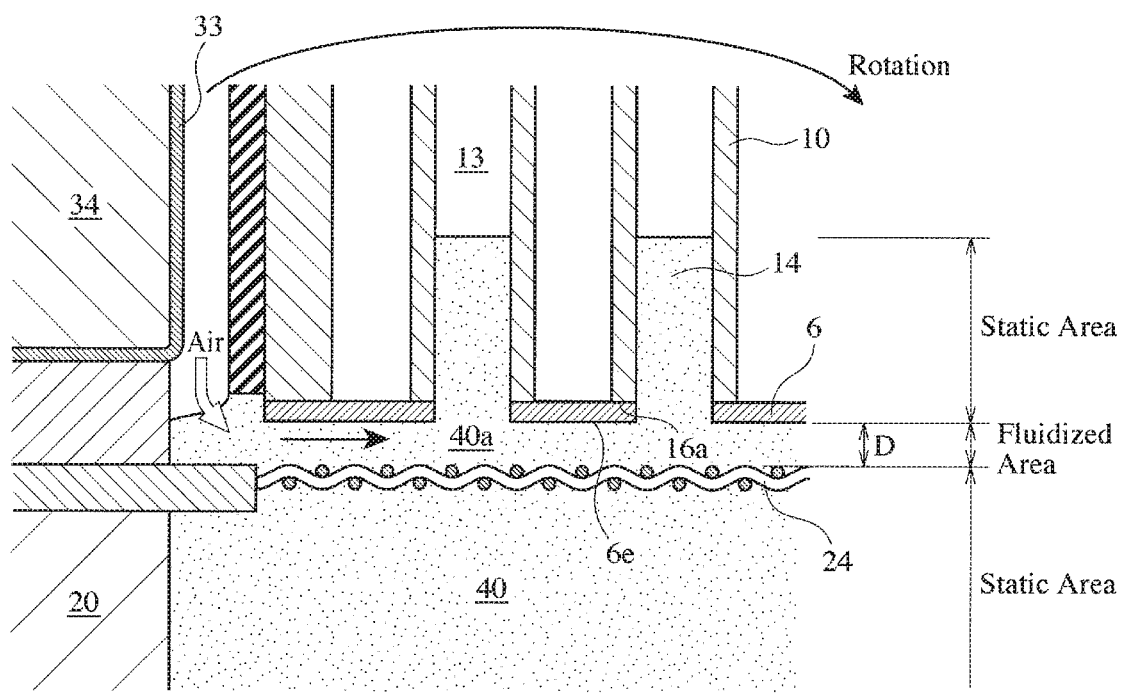
FIG. 9 is a partial cross-sectional view explaining the principle of the separation of a plugging material slurry layer.

As a result of intensive research with the above knowledge, it may be presumed that the effect of the present invention is obtained by the following principle. As shown in FIG. 9, when the ceramic honeycomb structure 10 placed above the metal net 24 by a slight distance D is rotated, the plugging material slurry layer 40a between the lower surface 6e of the sealing film attached to the lower end surface 16a of the ceramic honeycomb structure 10 and the upper surface and the metal net 24 is sufficiently fluidized due to a strong shearing force, making the plugging material slurry layer 40a easily separable. In addition, because the ceramic honeycomb structure 10 is rotated after the sealing is released, air easily enters the fluidized plugging material slurry layer 40a from the surroundings. Though not necessarily clear, this appears to be because the bonding of ceramic particles in the fluidized plugging material slurry layer 40a is weak due to so-called "thixotropy," thereby permitting air to easily enter.

When the ceramic honeycomb structure 10 is rotationally lifted in such a state, the fluidized plugging material slurry layer 40a starts to be separated, and then air enters in separated portions to form partial air layers. With such air layers formed in the plugging material slurry layer 40a gradually expanding, adjacent air layers are connected to secure the separation of the entire plugging material slurry layer 40a.

Even when the plugging material slurry layer 40a is sufficiently fluidized, air entering from the surroundings is necessary for the separation of the plugging material slurry layer 40a. When the ceramic honeycomb structure 10 is lifted without air entering from the surroundings, the plugging material slurry layer 40a is decompressed, thereby sucking the plugs 14 in the cells 13, resulting in length unevenness and dropping of the plugs 14. Thus, the important feature of the present invention is that the plugging material slurry layer 40a is fluidized by the rotation of the ceramic honeycomb structure 10, while permitting air to enter from the surroundings. Accordingly, the ceramic honeycomb structure 10 is rotated after the sealing is released, and lifted after the rotation starts.

Because the metal net used as the porous plate 24 provides the plugging material slurry layer 40a with an uneven outer peripheral surface, air easily enters from the surroundings. Therefore, the plugging material slurry layer 40a is rapidly separated, securely preventing the plugs 14 in the cells from being pulled back.

(6) Drying and Sintering

The plugs 14a, 14b formed in the end portions 15a, 15b of the predetermined cells 13a, 13b are dried and sintered. The drying and sintering conditions per se may be known. For example, the drying may be conducted using hot air at 80-150° C., microwaves, high-frequency waves, etc. Among them, high frequency waves are preferable because they can heat and dry only the plugs. The end surfaces 16a, 16b provided with the plugs 14a, 14b may be preliminarily dried on an electric hot plate before the above drying. The dried plugs may or may not be sintered, but the sintering, if conducted, is preferably at the sintering temperature of the ceramic material powder constituting the plugging material slurry (for example, 1400° C., when the ceramic material powder is made of a cordierite-producing material) for 5 hours. A furnace used for sintering may be batch-type or continuous. As a continuous furnace, a roller hearth kiln is preferable.

The present invention will be explained in more detail by Examples below without intention of restriction.

EXAMPLE 1

Kaolin powder, talc powder, silica powder and alumina powder were mixed to prepare cordierite-producing material powder comprising, by mass, 48-52% of $SiO_2$, 33-37% of $Al_2O_3$, and 12-15% of MgO, which was then fully mixed with methylcellulose (binder), a lubricant, and foamed resin balloons (pore-forming material) in a dry state. With a predetermined amount of water added, they were sufficiently blended to prepare a plasticized moldable ceramic material. The moldable ceramic material was molded by an extrusion-molding die, and cut to a honeycomb green body of 270 mm in diameter and 300 mm in length. The honeycomb green body was dried and sintered to obtain a cordierite-type ceramic honeycomb structure having a cell wall thickness of 0.3 mm, a cell pitch of 1.5 mm, porosity of 62%, and an average pore size of 21 μm. The outer periphery of the ceramic honeycomb structure was cut to an outer diameter of 265 mm, and end portions 15a, 15b were then ground to obtain the ceramic honeycomb structure 10 of final shape [FIG. 1(a)].

A sealing resin film of 0.09 mm in thickness was attached to each of both ends of the ceramic honeycomb structure 10 [FIG. 1(b)], and each sealing resin film was provided with penetrating pores at positions corresponding to cells to be plugged in a checkerboard pattern by laser beams [FIG. 1(c)].

100 parts by mass of ceramic material powder (cordierite-producing material powder, average particle size: 53 μm) was mixed with 1 part by mass of methylcellulose (binder), and then blended with 3 parts by mass of a dispersant and 57 parts by mass of ion-exchanged water, to prepare a plugging material slurry. The cordierite-producing material obtained by mixing, by mass, 6.3% of Kaolin, 41.1% of talc, 18.2% of silica, 23.3% of alumina, and 11.1% of aluminum hydroxide, was used. The plugging material slurry had viscosity of 15.0 Pa·s.

In the apparatus shown in FIGS. 2-4 and 8, the plugging material slurry 40 was supplied to the reservoir 20 through the inlet 22 by a Mohno pump (not shown). The metal net 24 [mesh size: 0.83 mm (55% of the cell pitch), wire diameter: 0.25 mm, opening ratio: 59%] was disposed on the upper opening 23 of the reservoir 20, and then the holding member 30 was fixed thereon. The inner diameter of the holding member 30 was 270 mm, which was the same as the size of the upper opening 23 of the reservoir 20, and larger than the 266-mm outer diameter of the ceramic honeycomb structure.

The holding member 30 had the fixing member 34 made of stainless steel, and the elastic member 33 made of silicone rubber was disposed on its inner periphery. With both end portions 33b, 33b inserted into the grooves 34a, 34a of the fixing member 34, the elastic member 33 was fixed to the fixing member 34 by the annular pressing plates 36a, 36b made of stainless steel and screws 37.

The plugging material slurry 40 was charged into the plugging material slurry reservoir 20 by a Mohno pump (not shown) so that it covered the upper surface of the metal net 24. A gap between a surface of the plugging material slurry on the metal net 24 and the lower end surface of the ceramic honeycomb structure 10 had a distance D. With the outer peripheral surface 110 of the ceramic honeycomb structure 10 gripped by the handling device 60, the lower surface 6e of the sealing film 6 attached to the lower end surface of the ceramic honeycomb structure 10 was apart from the upper surface of the metal net 24 by the distance D of 0.1 mm.

The distance D was measured by placing the ceramic honeycomb structure gripped by the handling device 60 above the metal net without the holding member 30, and inserting a feeler gauge into a gap between the surface of the sealing film attached to the lower end surface of the honeycomb structure and the metal net at four points circumferentially separate by 90°.

With air injected into a closed space 35 between the elastic member 33 and the inner periphery of the fixing member 34 through injection holes 38, the elastic member 33 was inflated to come into close contact with the outer peripheral surface of the ceramic honeycomb structure 10. In this state, a predetermined volume (for example, 200 cm$^3$) of a plugging material slurry 40 was supplied to the reservoir 20 by a Mohno pump (not shown), to introduce 200 cm$^3$ of the plugging material slurry 40 into the predetermined cells 13a of the ceramic honeycomb structure 10 through the penetrating pores 6a of the sealing film 6.

After a predetermined period of time (for example, 10 seconds) passed, the air introduced into the closed space 35 between the elastic member 33 and the inner periphery of the fixing member 34 was released. Thereafter, the ceramic honeycomb structure 10 whose outer peripheral surface was gripped by the handling device 60 was rotated in one direction by an angle of 90° at a speed of 20°/second (rotation step), and then lifted at a speed of 50 mm/second while rotating in the opposite direction at the same speed (lifting step). The holding member 30 was then taken out.

The plugs 14b were formed in the other-side end portions 15b of the ceramic honeycomb structure 10 in the same manner. Both plugs 14a, 14b were dried and sintered. An outer peripheral wall was formed on a peripheral surface of the ceramic honeycomb structure. In this way, 10 ceramic honeycomb filters were obtained. Each ceramic honeycomb filter had plugs of 10 mm in length.

EXAMPLE 2

10 ceramic honeycomb filters were obtained, with the plugs formed in the predetermined cells of a ceramic honeycomb structure in the same manner as in Example 1, except for changing the rotation angle to 60° in the rotation step.

EXAMPLE 3

10 ceramic honeycomb filters were obtained, with the plugs formed in the predetermined cells of a ceramic honeycomb structure in the same manner as in Example 1, except for changing the rotation speed to 10°/second in the rotation step.

EXAMPLE 4

10 ceramic honeycomb filters were obtained, with the plugs formed in the predetermined cells of the ceramic honeycomb structure in the same manner as in Example 1, except for changing a lifting speed to 20 mm/second in the lifting step.

EXAMPLE 5

10 ceramic honeycomb filters were obtained, with the plugs formed in the ceramic honeycomb structure in the same manner as in Example 1, except that flexible, urethane rubber rings of 5 cm in width were attached to lower end portions of the outer peripheral surface of the ceramic honeycomb structure as the second elastic member. With the attached urethane rubber rings, the outer peripheral surface of the ceramic honeycomb structure was brought into closer contact with the holding member, remarkably reducing the amount of a plugging material slurry attached to the outer peripheral surface of the ceramic honeycomb structure and the inner peripheral surface of the holding member.

EXAMPLE 6

10 ceramic honeycomb filters were obtained, with the plugs formed in the ceramic honeycomb structure in the same manner as in Example 5, except for using the apparatus shown in FIGS. 5 and 6. The baffle plate 25 in FIG. 6 had pores of 5.0 mm in diameter and an opening ratio of 35.4%.

EXAMPLE 7

10 ceramic honeycomb filters were obtained, with the plugs formed in the ceramic honeycomb structure in the same manner as in Example 1, except for using the metal net covering the upper opening of the reservoir 20 and having a mesh size of 1.7 mm (113% of cell pitch), a wire diameter of 0.25 mm and an opening ratio of 76%.

EXAMPLE 8

50% by mass of cordierite-producing material powder having an average particle size of 10 μm and 50% by mass of cordierite powder having an average particle size of 120 μm were mixed, to obtain ceramic material powder (average particle size: 72.5 μm) having a particle size distribution having a first peak at 105 μm and a second peak at 8.5 μm, the frequency of the first peak being higher than that of the second peak. The viscosity of the plugging material slurry contained in this ceramic material powder was 8.5 Pa·s. 10 ceramic honeycomb filters were obtained, with the plugs formed in the ceramic honeycomb structure in the same manner as in Example 1 except for using this plugging material slurry. The particle size distribution of the ceramic material powder was measured by a particle size distribution meter (Microtrack MT3000 available from Nikkiso Co., Ltd.).

COMPARATIVE EXAMPLE 1

10 ceramic honeycomb filters were obtained, with the plugs formed in the predetermined cells of the ceramic honeycomb structure in the same manner as in Example 1, except that the ceramic honeycomb structure was lifted at a speed of 50 mm/second without rotation.

EXAMPLE 9

10 ceramic honeycomb filters were obtained, with the plugs formed in the predetermined cells of the ceramic honeycomb structure in the same manner as in Example 1, except for changing the rotation angle to 10° in the rotation step.

EXAMPLE 10

10 ceramic honeycomb filters were obtained, with the plugs formed in the predetermined cells of the ceramic honeycomb structure in the same manner as in Example 1, except for changing the rotation speed to 60°/second in the rotation step.

EXAMPLE 11

10 ceramic honeycomb filters were obtained, with the plugs formed in the predetermined cells of the ceramic honeycomb structure in the same manner as in Example 1, except for changing a lifting speed to 90 mm/second in the lifting step.

COMPARATIVE EXAMPLE 2

10 ceramic honeycomb filters were obtained, with the plugs formed in the ceramic honeycomb structure in the same manner as in Example 1, except that the rotation step was conducted with the lower end surface of the ceramic honeycomb structure in contact with the upper surface of the metal net.

CONVENTIONAL EXAMPLE 1

In the conventional apparatus shown in FIG. 13, the ceramic honeycomb structure 10 was pressed downward (shown by the arrow F) to immerse the end portions 15a in a plugging material slurry in the vessel 90, so that the plugging material slurry was introduced into the predetermined cells to form plugs. Then, the ceramic honeycomb structure was lifted without rotation, and taken out of the vessel 90. 10 ceramic honeycomb filters were obtained by this method.

Figure 10:
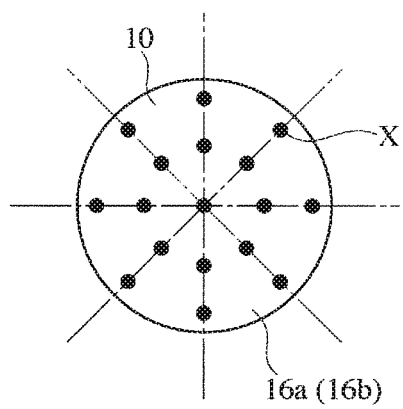
FIG. 10 is a schematic view showing the length-measuring positions of plugs.
Figure 11:
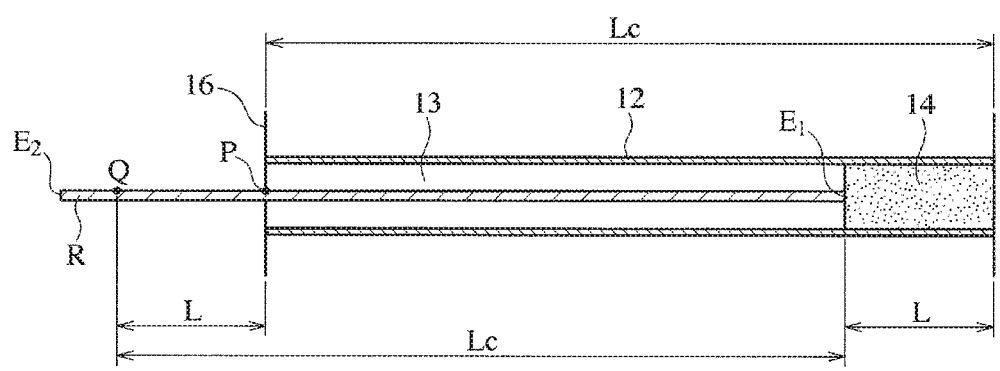
FIG. 11 is a schematic view showing a method of measuring the length of a plug.
Figure 12A:
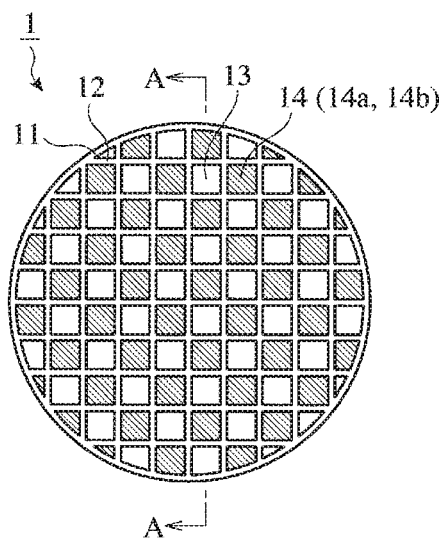
FIG. 12(a) is a schematic front view showing a ceramic honeycomb filter.
Figure 12B:
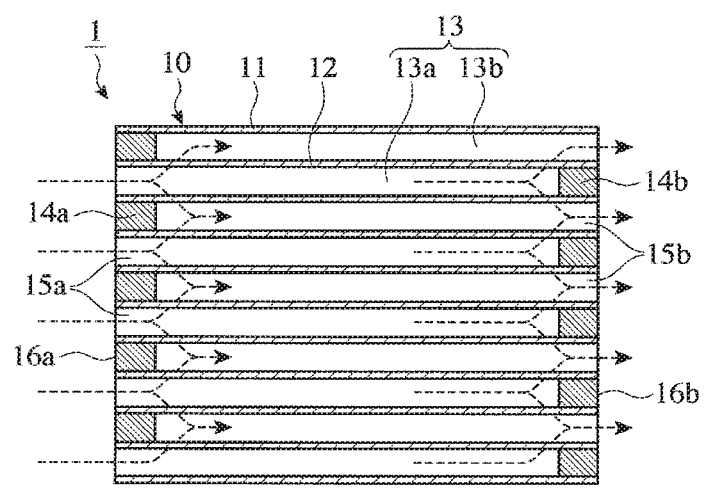
FIG. 12(b) is a cross-sectional view taken along the line A-A in FIG. 12(a).
Figure 13A:
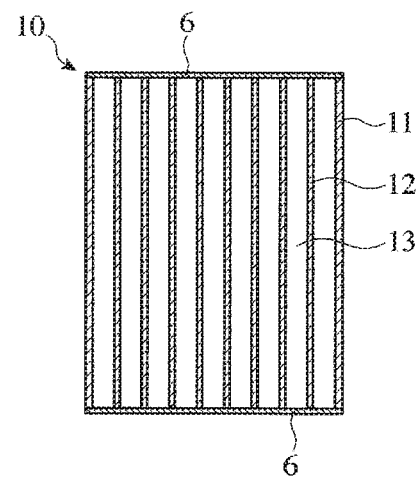
FIG. 13(a) is a schematic cross-sectional view showing a conventional plug-forming method, in which a sealing film is attached to one end surface of a ceramic honeycomb structure.
Figure 13B:
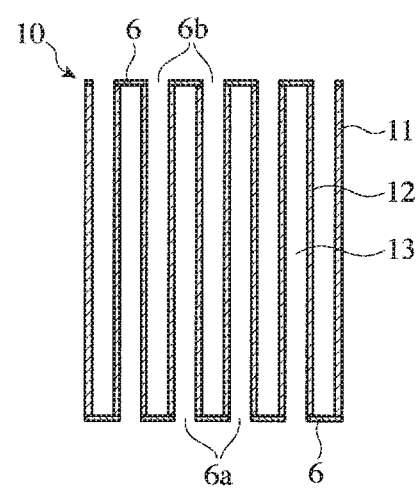
FIG. 13(b) is a schematic cross-sectional view showing a conventional plug-forming method, in which each of sealing films attached to both end surfaces of a ceramic honeycomb structure is alternately provided with penetrating pores in a checkerboard pattern.
Figure 13C:
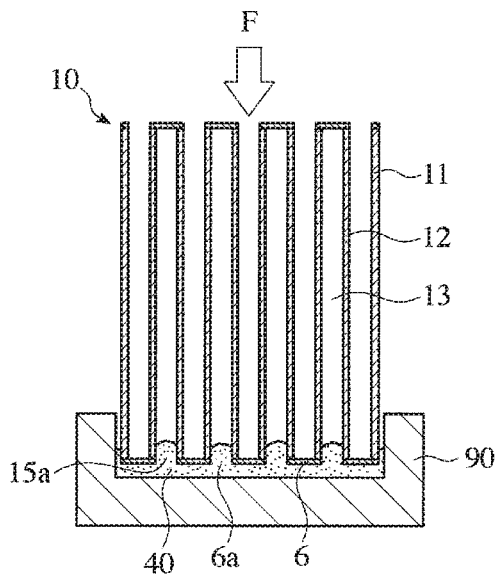
FIG. 13(c) is a schematic cross-sectional view showing a conventional plug-forming method, in which a ceramic honeycomb structure having sealing films provided with penetrating pores is immersed in a plugging material slurry.
Figure 13D:
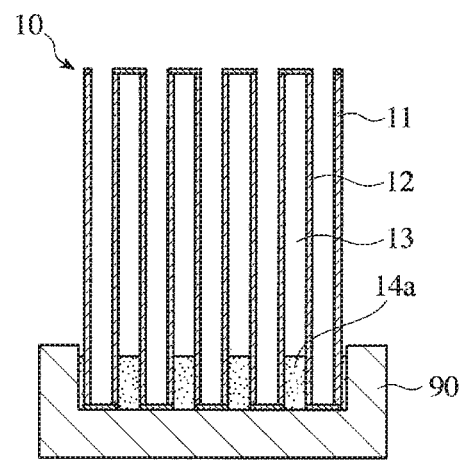
FIG. 13(d) is a schematic cross-sectional view showing a conventional plug-forming method, in which a plugging material slurry is introduced into one-side end portions of a ceramic honeycomb structure.
Figure 13E:
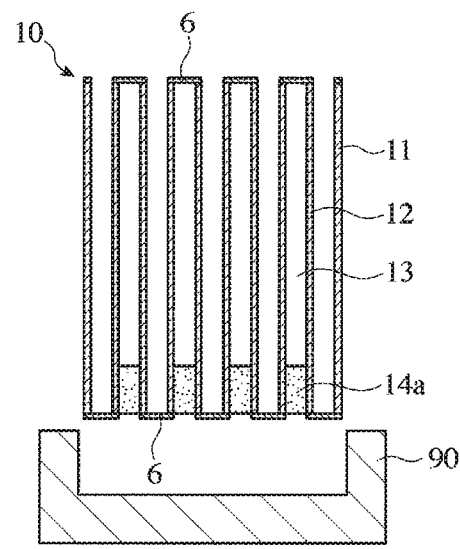
FIG. 13(e) is a schematic cross-sectional view showing a conventional plug-forming method, in which a ceramic honeycomb structure having a plugging material slurry introduced into one-side end portions is taken out of the reservoir.
Figure 13F:
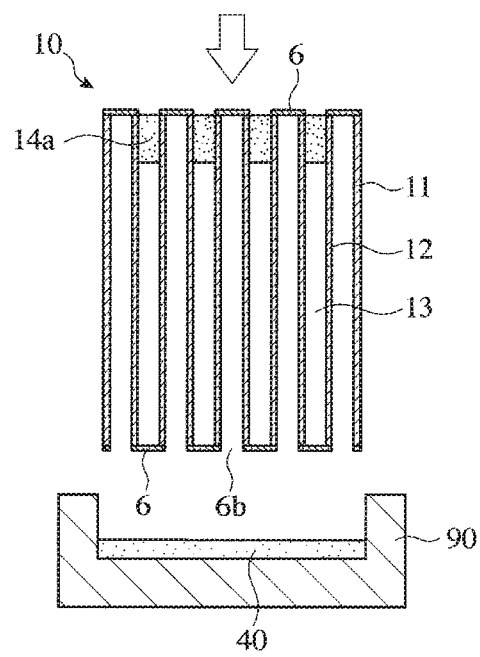
FIG. 13(f) is a schematic cross-sectional view showing a conventional plug-forming method, in which the other-side end portion of a ceramic honeycomb structure is immersed in a plugging material slurry.
Figure 13G:
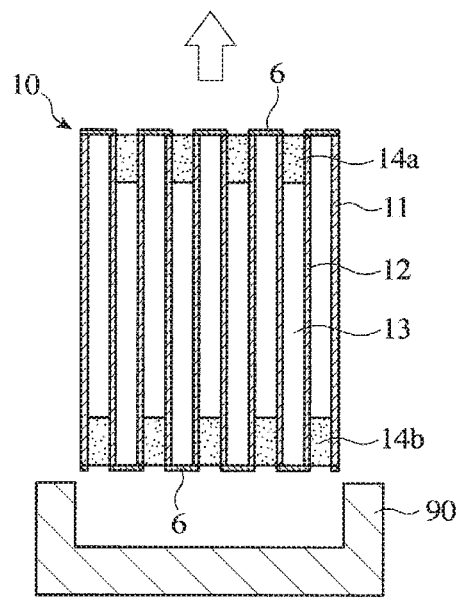
FIG. 13(g) is a schematic cross-sectional view showing a conventional plug-forming method, in which a ceramic honeycomb structure having a plugging material slurry charged in a checkerboard pattern into in both end portions is taken out of the reservoir.
Figure 14:
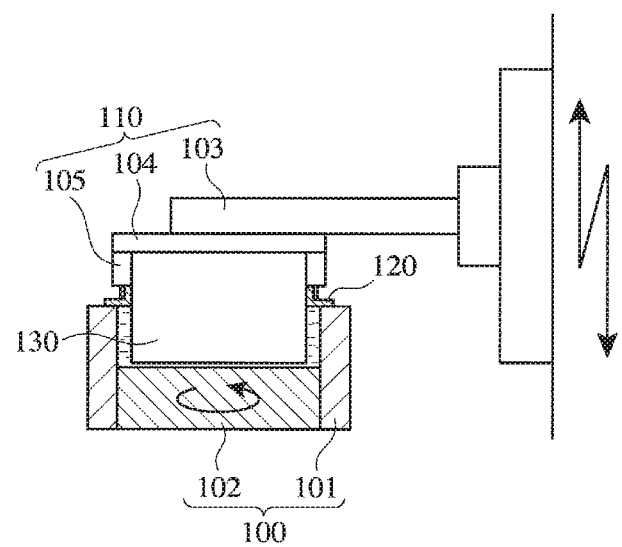
FIG. 14 is a schematic view showing a method for plugging a ceramic honeycomb structure, which is described in JP 2008-55347 A.
Figure 15:
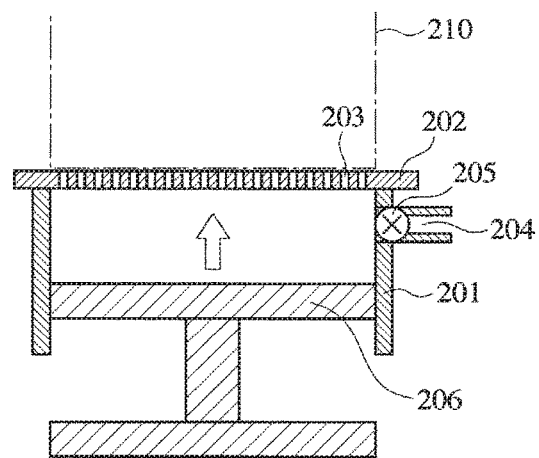
FIG. 15 is a schematic view showing an apparatus for plugging a honeycomb structure, which is described in JP 2009-6629 A.
Figure 16:
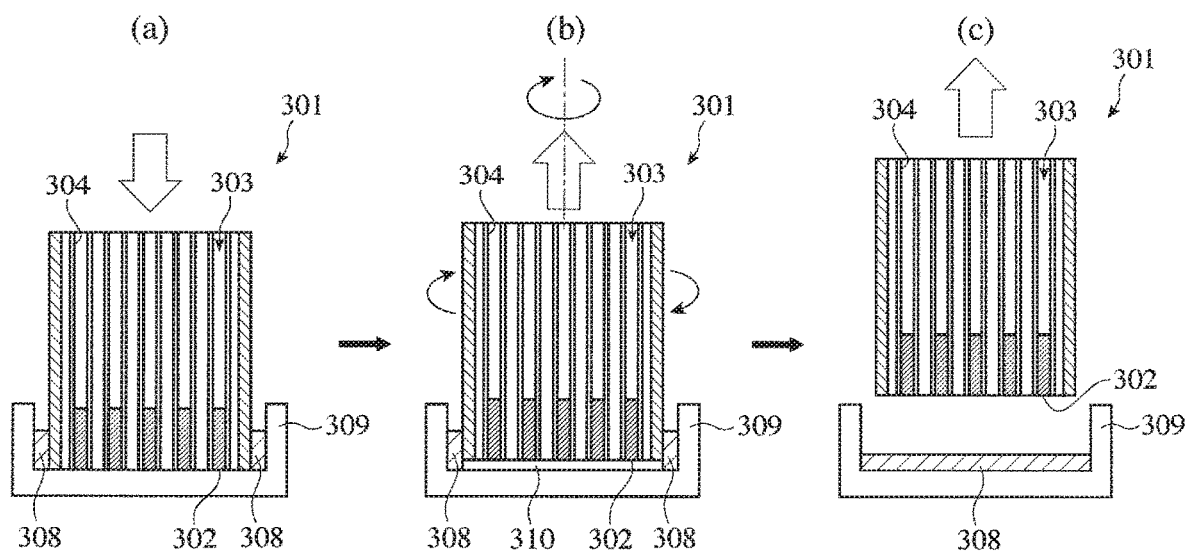
FIG. 16 is a schematic view showing a method for producing a ceramic honeycomb filter, which is described in JP 2004-25098 A.
Figure 17:
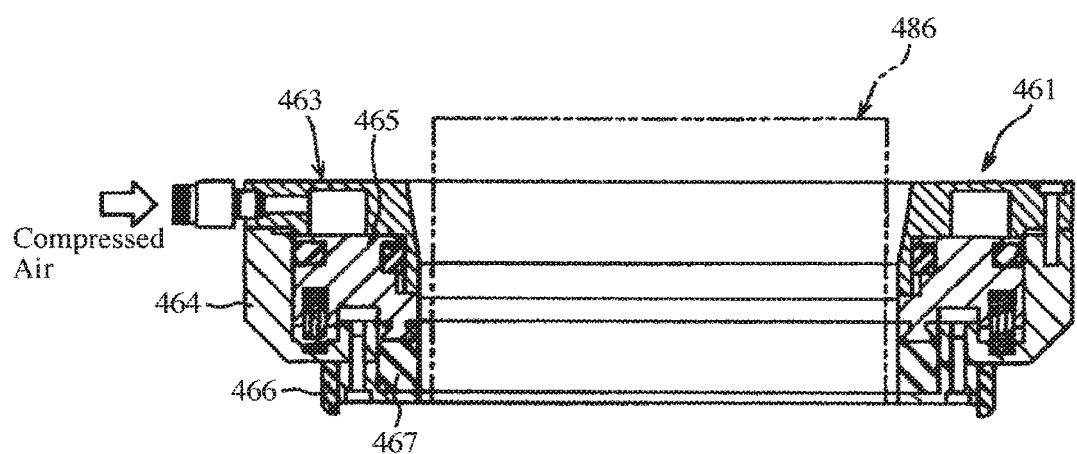
FIG. 17 is a schematic view showing an apparatus for plugging a ceramic honeycomb structure, which is described in JP 2008-55796 A.

As shown in FIG. 10, the lengths of the plugs (shown by X) were measured at 17 points for each end portion (34 points for both end portions) of each ceramic honeycomb filter. As illustrated in FIG. 11, the measuring method comprised inserting a rod-shaped SUS member R of 0.8 mm in diameter (having a mark Q at a position separate from an end $E_1$ by a distance corresponding to the length Lc of the ceramic honeycomb filter) into each cell 13 until it came into contact with the plug 14, and then measuring a length L between a position P where the rod-shaped member R crossed the end surface 16 of the ceramic honeycomb filter and the mark Q. The measured length L was regarded as the length L of the plugs 14.

In each of Examples 1-11, Comparative Examples 1 and 2, and Conventional Example 1, the unevenness in length L of the plugs in one ceramic honeycomb filter was evaluated by calculating standard deviation of the lengths L of 34 plugs, according to the following standards. The unevenness in length L of the plugs among individual ceramic honeycomb filters was evaluated by determining the average length Lav of the plugs in each ceramic honeycomb filter, and calculating standard deviation of the average lengths Lav of 10 ceramic honeycomb filters, according to the following standards.

Excellent: The standard deviation was less than 0.50,
Good: The standard deviation was 0.50 or more and less than 0.60, and
Poor: The standard deviation was 0.60 or more.
The result is shown in Table 1.

TABLE 1

| | Unevenness in Length of Plugs | | |
| No. | In one Ceramic Honeycomb Filter | Among Individual Ceramic Honeycomb Filters | Dropping of Plugs |
| --- | --- | --- | --- |
| Example 1 | Excellent | Excellent | No |
| Example 2 | Excellent | Excellent | No |
| Example 3 | Excellent | Excellent | No |
| Example 4 | Excellent | Excellent | No |
| Example 5 | Excellent | Excellent | No |
| Example 6 | Excellent | Excellent | No |
| Example 7 | Excellent | Excellent | No |
| Example 8 | Excellent | Excellent | No |
| Com. Ex. 1 | Poor | Poor | Yes |
| Example 9 | Good | Excellent | No |
| Example 10 | Good | Excellent | No |
| Example 11 | Good | Good | No |
| Com. Ex. 2 | Poor | Poor | Yes |
| Con. Ex. 1 | Poor | Poor | Yes |

As is clear from Table 1, (a) in Examples 1-11, the length unevenness of the plugs was small not only in one ceramic honeycomb structure but also among individual ceramic honeycomb structures, and no dropping of the plugs was observed, but (b) in Comparative Examples 1 and 2, and Conventional Example 1, the length unevenness of the plugs was large both in one ceramic honeycomb structure and among individual ceramic honeycomb structures, and some adjacent plugs dropped in some ceramic honeycomb filters.

DESCRIPTION OF REFERENCE NUMERALS

1: Ceramic honeycomb filter
6: Sealing film
6a, 6b: Penetrating pore of sealing film
6e: Lower surface of sealing film
10: Ceramic honeycomb structure
11: Peripheral wall
12: Cell wall
13, 13a, 13b: Cell
14a, 14b: Plug 15a, 15b: End portion of ceramic honeycomb structure
16, 16a, 16b: End surface of ceramic honeycomb structure
20: Plugging material slurry reservoir
21: Reservoir body
22: Inlet of reservoir
23: Upper opening of reservoir
24: Porous plate (metal net)
24a: Porous portion of porous plate
24b: Ring portion of porous plate
25: Baffle plate
26: Leg of baffle plate
30: Holding member
31: Cavity
33: Elastic member
33a: Inflatable portion of elastic member
33b: End portion of elastic member
34: Fixing member
34a: Groove of fixing member
35: Closed space
36a, 36b: Annular pressing plate
37: Screw
38: Injection hole
40: Plugging material slurry
40a: Plugging material slurry layer between a lower surface of a ceramic honeycomb structure and an upper surface of a porous plate
50: Pipe
52: Pump
53: Tank
54: Blade
D: Distance between a lower surface of a sealing film attached to a lower end surface of a ceramic honeycomb structure and an upper surface of a porous plate

What is claimed is:

1. A method for producing a ceramic honeycomb filter comprising a ceramic honeycomb structure having a plurality of longitudinal cells partitioned by porous cell walls, each of said longitudinal cells extending from one end to the other end of the honeycomb structure, and plugs formed in predetermined cells, said method comprising:
   (1) an apparatus having (a) a plugging material slurry reservoir having an inlet through which a plugging material slurry is supplied and an upper opening through which said plugging material slurry exits, (b) a porous plate with pluralities of openings covering said upper opening of said reservoir, and (c) a holding member fixed to an upper end of said reservoir for holding said ceramic honeycomb structure to which a sealing film is attached, said holding member having an elastic member on the inner peripheral side, said elastic member being inflatable to come into contact with an outer peripheral surface of said ceramic honeycomb structure during the formation of said plugs;
   (2) sealing a clearance between said outer peripheral surface of said ceramic honeycomb structure and said holding member by inflating the elastic member, while a lower surface of said sealing film attached to a lower end surface of said ceramic honeycomb structure is apart from an upper surface of said porous plate by a distance D of more than 0 mm and less than or equal to 2.0 mm;
   (3) supplying a predetermined volume of said plugging material slurry into said reservoir through said inlet to introduce it into said predetermined cells of said ceramic honeycomb structure;
   (4) rotating said ceramic honeycomb structure after the sealing of said ceramic honeycomb structure is released; and
   (5) lifting said ceramic honeycomb structure after the rotation starts.

2. The method for producing a ceramic honeycomb filter according to claim 1, wherein the openings in said porous plate have inner diameters of 0.5-1.5 mm.

3. The method for producing a ceramic honeycomb filter according to claim 1, wherein said porous plate is a metal net.

4. The method for producing a ceramic honeycomb filter according to claim 3, wherein said metal net has a mesh size of 0.5-1.5 mm.

5. The method for producing a ceramic honeycomb filter according to claim 1, wherein said ceramic honeycomb structure is rotated in one direction by a predetermined angle, and then lifted with rotation in an opposite direction.

6. The method for producing a ceramic honeycomb filter according to claim 1, wherein said holding member has a fixing member having a through-hole communicating with said elastic member, and air is introduced under pressure into a closed space between said fixing member and said elastic member via said through-hole, to inflate said elastic member to come into contact with the outer peripheral surface of said ceramic honeycomb structure.

7. The method for producing a ceramic honeycomb filter according to claim 1, wherein a second elastic member with which said inflated elastic member is brought into contact is disposed on a lower portion of the outer peripheral surface of said ceramic honeycomb structure.

8. An apparatus for producing a ceramic honeycomb filter having a ceramic honeycomb structure having a plurality of longitudinal cells partitioned by porous cell walls, each of said longitudinal cells extending from one end to the other end of the honeycomb structure, and plugs formed in predetermined; cells, comprising:
   (a) a plugging material slurry reservoir having an inlet through which a plugging material slurry is supplied and an upper opening through which said plugging material slurry exits;
   (b) a porous plate with pluralities of openings covering said upper opening of said reservoir;
   (c) a holding member fixed to an upper end of said reservoir for holding said ceramic honeycomb structure to which a sealing film is attached, said holding member having an elastic member on the inner peripheral side, said elastic member being inflatable to come into contact with an outer peripheral surface of said ceramic honeycomb structure during the formation of said plugs;
   (d) a device for inflating said elastic member to seal a clearance between said outer peripheral surface of said ceramic honeycomb structure and said holding member, while a lower surface of said sealing film attached to a lower end surface of said ceramic honeycomb structure is apart from an upper surface of said porous plate by a distance D of more than 0 mm and less than or equal to 2.0 mm;
   (e) a device for supplying a predetermined volume of said plugging material slurry into said reservoir through said inlet to introduce it into said predetermined cells of said ceramic honeycomb structure;
   (f) a device for rotating said ceramic honeycomb structure after the sealing of said ceramic honeycomb structure is released; and (g) a device for lifting said ceramic honeycomb structure after the rotation starts.

9. The apparatus for producing a ceramic honeycomb filter according to claim 8, wherein the openings in said porous plate have inner diameters of 0.5-1.5 mm.

10. The apparatus for producing a ceramic honeycomb filter according to claim 8, wherein said porous plate is a metal net.

11. The apparatus for producing a ceramic honeycomb filter according to claim 10, wherein said metal net has a mesh size of 0.5-1.5 mm.

12. The apparatus for producing a ceramic honeycomb filter according to claim 1, wherein said ceramic honeycomb structure is rotated in one direction by a predetermined angle, and then lifted with rotation in an opposite direction.

13. The apparatus for producing a ceramic honeycomb filter according to claim 1, wherein said holding member has a fixing member having a through-hole communicating with said elastic member, and air is introduced under pressure into a closed space between said fixing member and said elastic member via said through-hole, to inflate said elastic member to come into contact with the outer peripheral surface of said ceramic honeycomb structure.

14. The apparatus for producing a ceramic honeycomb filter according to claim 1, wherein a second elastic member with which said inflated elastic member is brought into contact is disposed on a lower portion of the outer peripheral surface of said ceramic honeycomb structure.

15. The apparatus for producing a ceramic honeycomb filter according to claim 1, further comprising a baffle plate for preventing a flow of said plugging material slurry supplied through said inlet from coming into direct contact with said porous plate between said inlet and said upper opening in said reservoir.

16. The apparatus for producing a ceramic honeycomb filter according to claim 15, wherein said baffle plate has pluralities of pores with an opening area ratio of 10-60%.

* * * * *